United States Patent
Bull

(10) Patent No.: US 12,282,367 B2
(45) Date of Patent: Apr. 22, 2025

(54) OPERATIONAL COORDINATION OF LOAD CONTROL DEVICES FOR CONTROL OF ELECTRICAL LOADS

(71) Applicant: Lutron Technology Company LLC, Coopersburg, PA (US)

(72) Inventor: John H. Bull, Coplay, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/716,309

(22) Filed: Apr. 8, 2022

(65) Prior Publication Data

US 2022/0229480 A1    Jul. 21, 2022

Related U.S. Application Data

(63) Continuation of application No. 16/030,310, filed on Jul. 9, 2018, now Pat. No. 11,301,013, which is a
(Continued)

(51) Int. Cl.
*G05F 1/26* (2006.01)
*G06F 1/26* (2006.01)
(Continued)

(52) U.S. Cl.
CPC .............. *G06F 1/26* (2013.01); *H04L 12/12* (2013.01); *H04L 12/282* (2013.01); *H04L 2012/2841* (2013.01); *H04L 2012/285* (2013.01)

(58) Field of Classification Search
CPC ......... G06F 1/26; H04L 12/12; H04L 12/282; H04L 2012/285; H04L 2012/2841
See application file for complete search history.

(56) References Cited

U.S. PATENT DOCUMENTS

| | | | |
|---|---|---|---|
| 4,864,588 A | 9/1989 | Simpson et al. |
| 4,932,037 A | 6/1990 | Simpson et al. |

(Continued)

FOREIGN PATENT DOCUMENTS

| | | |
|---|---|---|
| CA | 2892464 A1 | 11/2015 |
| CN | 101789978 A | 7/2010 |

(Continued)

OTHER PUBLICATIONS

U.S. Appl. No. 16/715,507, filed Dec. 16, 2019.
(Continued)

*Primary Examiner* — M. N. Von Buhr
(74) *Attorney, Agent, or Firm* — Michael S. Czarnecki; Glen R. Farbanish; Philip N. Smith

(57) ABSTRACT

A load control device for controlling the power delivered from an AC power source to an electrical load is able to receive radio-frequency (RF) signals from a Wi-Fi-enabled device, such as a smart phone, via a wireless local area network. The load control device comprises a controllably conductive device, a controller for rendering the controllably conductive device conductive and non-conductive, and a Wi-Fi module operable to receive the RF signals directly from the wireless network. The controller may cooperate with one or more other devices to synchronize in time the adjustments made by one or more load control devices that are operable to control the power delivered to one or more electrical loads. The one or more load control devices may also cooperate with one or more Internet based information providers to provide preconfigured and condition based adjustments of the one or more electrical loads.

24 Claims, 14 Drawing Sheets

Related U.S. Application Data continuation of application No. 13/793,870, filed on Mar. 11, 2013, now Pat. No. 10,019,047.

(60) Provisional application No. 61/745,378, filed on Dec. 21, 2012.

(51) Int. Cl.
*H04L 12/12* (2006.01)
*H04L 12/28* (2006.01)

(56) References Cited

U.S. PATENT DOCUMENTS

| | | |
|---|---|---|
| 4,995,053 A | 2/1991 | Simpson et al. |
| 5,239,205 A | 8/1993 | Hoffman et al. |
| 5,340,954 A | 8/1994 | Hoffman et al. |
| 5,454,077 A | 9/1995 | Cheron |
| 5,488,571 A | 1/1996 | Jacobs et al. |
| 5,519,704 A | 5/1996 | Farinacci et al. |
| 5,602,540 A | 2/1997 | Spillman, Jr. |
| 5,627,863 A | 5/1997 | Aslanis et al. |
| 5,637,930 A | 6/1997 | Rowen et al. |
| 5,637,964 A | 6/1997 | Hakkarainen et al. |
| 5,736,965 A | 4/1998 | Mosebrook et al. |
| 5,812,819 A | 9/1998 | Rodwin et al. |
| 5,818,128 A | 10/1998 | Hoofman et al. |
| 5,838,226 A | 11/1998 | Houggy et al. |
| 5,848,054 A | 12/1998 | Mosebrook et al. |
| 5,905,442 A | 5/1999 | Mosebrook et al. |
| 5,982,103 A | 11/1999 | Mosebrook et al. |
| 6,167,464 A | 12/2000 | Kretschmann |
| 6,169,377 B1 | 1/2001 | Bryde et al. |
| 6,300,727 B1 | 10/2001 | Bryde et al. |
| 6,324,089 B1 | 11/2001 | Symoen et al. |
| 6,380,696 B1 | 4/2002 | Sembhi et al. |
| 6,437,692 B1 | 8/2002 | Petite et al. |
| 6,505,255 B1 * | 1/2003 | Akatsu ............... H04L 12/66 |
| | | 709/239 |
| 6,526,581 B1 | 2/2003 | Edson |
| 6,545,434 B2 | 4/2003 | Sembhi et al. |
| 6,687,487 B1 | 2/2004 | Mosebrook et al. |
| 6,803,728 B2 | 10/2004 | Balasubramaniam et al. |
| 6,807,463 B1 | 10/2004 | Cunningham et al. |
| 6,831,569 B2 | 12/2004 | Wang et al. |
| 6,856,236 B2 | 2/2005 | Christensen et al. |
| 6,859,644 B2 | 2/2005 | Wang |
| 6,876,295 B1 | 4/2005 | Lewis |
| 6,879,806 B2 | 4/2005 | Shorty |
| 6,891,838 B1 | 5/2005 | Petite et al. |
| 6,903,650 B2 | 6/2005 | Murray |
| 6,914,533 B2 | 7/2005 | Petite |
| 6,914,893 B2 | 7/2005 | Petite |
| 6,927,547 B2 | 8/2005 | Walko et al. |
| 6,980,080 B2 | 12/2005 | Christensen et al. |
| 7,035,270 B2 | 4/2006 | Moore, Jr. et al. |
| 7,053,767 B2 | 5/2006 | Petite et al. |
| 7,085,627 B2 | 8/2006 | Bamberger et al. |
| 7,089,066 B2 | 8/2006 | Hesse et al. |
| 7,102,502 B2 | 9/2006 | Autret |
| 7,103,511 B2 | 9/2006 | Petite |
| 7,106,261 B2 | 9/2006 | Nagel et al. |
| 7,126,291 B2 | 10/2006 | Kruse et al. |
| 7,211,968 B2 | 5/2007 | Adamson et al. |
| 7,218,998 B1 | 5/2007 | Neale |
| 7,219,141 B2 | 5/2007 | Bonasia et al. |
| 7,307,542 B1 | 12/2007 | Chandler et al. |
| 7,323,991 B1 | 1/2008 | Eckert et al. |
| 7,345,270 B1 | 3/2008 | Jones et al. |
| 7,346,016 B2 | 3/2008 | Nielsen et al. |
| 7,358,927 B2 | 4/2008 | Luebke et al. |
| 7,362,285 B2 | 4/2008 | Webb et al. |
| 7,408,525 B2 | 8/2008 | Webb et al. |
| 7,451,001 B2 | 11/2008 | Harwood |
| 7,498,952 B2 | 3/2009 | Newman, Jr. |
| 7,514,884 B2 * | 4/2009 | Potucek ............... H05B 47/155 |
| | | 315/323 |
| 7,525,928 B2 | 4/2009 | Cutler |
| 7,548,216 B2 | 6/2009 | Webb et al. |
| 7,573,208 B2 | 8/2009 | Newman, Jr. |
| 7,573,436 B2 | 8/2009 | Webb et al. |
| 7,598,684 B2 | 10/2009 | Lys et al. |
| 7,668,990 B2 * | 2/2010 | Krzyzanowski ... H04N 21/4131 |
| | | 710/72 |
| 7,687,744 B2 | 3/2010 | Walter et al. |
| 7,697,492 B2 | 4/2010 | Petite |
| 7,714,790 B1 | 5/2010 | Feldstein et al. |
| 7,755,505 B2 | 7/2010 | Johnson et al. |
| 7,756,086 B2 | 7/2010 | Petite et al. |
| 7,756,097 B2 | 7/2010 | Uehara et al. |
| 7,756,556 B2 | 7/2010 | Patel et al. |
| 7,805,134 B2 | 9/2010 | Mirza-Baig |
| 7,821,160 B1 | 10/2010 | Roosli et al. |
| 7,852,765 B2 | 12/2010 | Neuman et al. |
| 7,853,221 B2 | 12/2010 | Rodriguez et al. |
| 7,889,051 B1 | 2/2011 | Billig et al. |
| 8,013,732 B2 | 9/2011 | Petite et al. |
| 8,031,650 B2 | 10/2011 | Petite et al. |
| 8,035,255 B2 | 10/2011 | Kurs et al. |
| 8,146,074 B2 | 5/2012 | Altonen et al. |
| 8,228,163 B2 | 7/2012 | Cash et al. |
| 8,254,838 B2 | 8/2012 | Feldstein |
| 8,339,247 B2 | 12/2012 | Adamson et al. |
| 8,364,319 B2 | 1/2013 | Roosli |
| 8,368,310 B1 | 2/2013 | Roosli |
| 8,379,564 B2 | 2/2013 | Petite et al. |
| 8,396,007 B2 | 3/2013 | Gonia et al. |
| 8,416,074 B2 | 4/2013 | Sadwick |
| 8,516,087 B2 * | 8/2013 | Wilson ............... H04N 21/4131 |
| | | 709/224 |
| 8,525,372 B2 | 9/2013 | Huang |
| 8,536,792 B1 * | 9/2013 | Roosli .................. H05B 47/175 |
| | | 315/159 |
| 8,548,607 B1 | 10/2013 | Belz et al. |
| 8,598,978 B2 | 12/2013 | Knode |
| 8,607,298 B2 * | 12/2013 | Durden ............... H04N 21/8126 |
| | | 725/147 |
| 8,742,686 B2 | 6/2014 | Zampini, II et al. |
| 8,792,401 B2 | 7/2014 | Banks et al. |
| 8,890,435 B2 | 11/2014 | Bora et al. |
| 8,892,261 B2 | 11/2014 | Hoonhout et al. |
| 8,896,414 B2 * | 11/2014 | Vinkenvleugel ....... H05B 47/19 |
| | | 340/4.62 |
| 9,049,753 B1 | 6/2015 | Wassel et al. |
| 9,066,381 B2 | 6/2015 | Valois et al. |
| 9,124,442 B2 * | 9/2015 | McCormack ......... H04L 12/282 |
| 9,178,369 B2 | 11/2015 | Partovi |
| 9,253,857 B2 | 2/2016 | VanDer Werff |
| 9,288,228 B2 | 3/2016 | Suumaki |
| 9,363,304 B2 * | 6/2016 | Folkmanis ............... G06F 9/445 |
| 9,368,025 B2 | 6/2016 | Carmen, Jr. |
| 9,413,171 B2 | 8/2016 | Neyhart |
| 9,445,482 B2 | 9/2016 | Brochu et al. |
| 9,445,485 B2 | 9/2016 | Reed |
| 9,548,797 B1 | 1/2017 | Green et al. |
| 9,641,959 B2 | 5/2017 | Brochu et al. |
| 9,766,645 B2 | 9/2017 | Imes et al. |
| 9,767,249 B1 | 9/2017 | Belz et al. |
| 9,985,436 B2 * | 5/2018 | Courtney ............. H05B 47/155 |
| 10,019,047 B2 * | 7/2018 | Bull ........................ H04L 12/12 |
| 10,050,444 B2 | 8/2018 | Neyhart |
| 10,135,629 B2 * | 11/2018 | Browne, Jr. ....... H05B 47/1985 |
| 10,244,086 B2 * | 3/2019 | Newman, Jr. ........... H04L 12/66 |
| 10,271,407 B2 | 4/2019 | Pessina et al. |
| 10,314,132 B1 | 6/2019 | Wilde |
| 10,516,546 B2 | 12/2019 | Browne, Jr. et al. |
| 10,587,147 B2 | 3/2020 | Carmen, Jr. |
| 10,588,204 B2 | 3/2020 | Pessina et al. |
| 10,693,558 B2 | 6/2020 | Economy |
| 11,301,013 B2 * | 4/2022 | Bull ........................ H04L 12/12 |
| 11,470,187 B2 * | 10/2022 | Newman, Jr. ........... H04L 69/18 |
| 2001/0024164 A1 | 9/2001 | Kawamura et al. |
| 2002/0010518 A1 | 1/2002 | Reid et al. |
| 2002/0043938 A1 | 4/2002 | Lys |

(56) References Cited

U.S. PATENT DOCUMENTS

| | | |
|---|---|---|
| 2002/0060530 A1 | 5/2002 | Sembhi et al. |
| 2002/0073183 A1 | 6/2002 | Yoon et al. |
| 2002/0087436 A1 | 7/2002 | Guthrie et al. |
| 2002/0113909 A1 | 8/2002 | Sherwood |
| 2002/0154025 A1 | 10/2002 | Ling |
| 2003/0034898 A1 | 2/2003 | Shamoon et al. |
| 2003/0040813 A1 | 2/2003 | Gonzales et al. |
| 2003/0109270 A1 | 6/2003 | Shorty |
| 2003/0151493 A1 | 8/2003 | Straumann et al. |
| 2003/0197993 A1 | 10/2003 | Mirowski et al. |
| 2004/0036624 A1 | 2/2004 | Ballew et al. |
| 2004/0052076 A1 | 3/2004 | Mueller et al. |
| 2004/0058706 A1 | 3/2004 | Williamson et al. |
| 2004/0059840 A1 | 3/2004 | Perego et al. |
| 2004/0193998 A1 | 9/2004 | Blackburn et al. |
| 2004/0217718 A1 | 11/2004 | Kumar et al. |
| 2005/0030153 A1 | 2/2005 | Mullet et al. |
| 2005/0045429 A1 | 3/2005 | Baker |
| 2005/0048944 A1 | 3/2005 | Wu |
| 2005/0156708 A1 | 7/2005 | Puranik et al. |
| 2005/0179558 A1 | 8/2005 | Williams et al. |
| 2005/0253538 A1 | 11/2005 | Shah et al. |
| 2005/0285547 A1 | 12/2005 | Piepgras et al. |
| 2006/0027081 A1 | 2/2006 | Chang et al. |
| 2006/0044152 A1 | 3/2006 | Wang |
| 2006/0045107 A1* | 3/2006 | Kucenas .......... H04N 21/42204 348/E5.002 |
| 2006/0109203 A1 | 5/2006 | Huber et al. |
| 2006/0154598 A1 | 7/2006 | Rudland et al. |
| 2006/0171332 A1 | 8/2006 | Barnum |
| 2006/0174102 A1 | 8/2006 | Smith et al. |
| 2006/0192697 A1 | 8/2006 | Quick et al. |
| 2006/0202851 A1 | 9/2006 | Cash et al. |
| 2006/0251059 A1 | 11/2006 | Otsu et al. |
| 2006/0256798 A1 | 11/2006 | Quick et al. |
| 2006/0273970 A1 | 12/2006 | Mosebrook et al. |
| 2006/0284734 A1 | 12/2006 | Newman, Jr. |
| 2006/0285150 A1 | 12/2006 | Jung et al. |
| 2007/0051529 A1 | 3/2007 | Soccoli et al. |
| 2007/0083294 A1 | 4/2007 | Bruno |
| 2007/0085699 A1 | 4/2007 | Walters et al. |
| 2007/0085700 A1 | 4/2007 | Walters et al. |
| 2007/0085701 A1 | 4/2007 | Walter et al. |
| 2007/0085702 A1 | 4/2007 | Walters et al. |
| 2007/0097993 A1 | 5/2007 | Bojahra et al. |
| 2007/0110192 A1 | 5/2007 | Steiner |
| 2007/0112939 A1 | 5/2007 | Wilson et al. |
| 2007/0121323 A1 | 5/2007 | Pawlik et al. |
| 2007/0165997 A1 | 7/2007 | Suzuki et al. |
| 2007/0176788 A1 | 8/2007 | Mor et al. |
| 2007/0229300 A1 | 10/2007 | Masato et al. |
| 2008/0037485 A1* | 2/2008 | Osinga .................. H04L 45/00 370/338 |
| 2008/0055073 A1 | 3/2008 | Raneri et al. |
| 2008/0068126 A1 | 3/2008 | Johnson et al. |
| 2008/0068204 A1 | 3/2008 | Carmen et al. |
| 2008/0089266 A1 | 4/2008 | Orsat |
| 2008/0111491 A1 | 5/2008 | Spira |
| 2008/0136261 A1 | 6/2008 | Mierta |
| 2008/0136356 A1 | 6/2008 | Zampini et al. |
| 2008/0136663 A1 | 6/2008 | Courtney et al. |
| 2008/0147337 A1 | 6/2008 | Walters et al. |
| 2008/0148359 A1 | 6/2008 | Kezys et al. |
| 2008/0183316 A1 | 7/2008 | Clayton |
| 2008/0192767 A1 | 8/2008 | Howe et al. |
| 2008/0218099 A1 | 9/2008 | Newman |
| 2008/0258650 A1 | 10/2008 | Steiner et al. |
| 2008/0265799 A1 | 10/2008 | Sibert |
| 2008/0278297 A1 | 11/2008 | Steiner et al. |
| 2008/0284327 A1 | 11/2008 | Kang et al. |
| 2009/0001941 A1 | 1/2009 | Hsu et al. |
| 2009/0026966 A1 | 1/2009 | Budde et al. |
| 2009/0079268 A1 | 3/2009 | Cook et al. |
| 2009/0085408 A1 | 4/2009 | Bruhn |
| 2009/0113229 A1 | 4/2009 | Cataldo et al. |
| 2009/0150004 A1 | 6/2009 | Wang et al. |
| 2009/0167484 A1 | 7/2009 | Burr |
| 2009/0206983 A1 | 8/2009 | Knode et al. |
| 2009/0227205 A1 | 9/2009 | Rofougaran |
| 2009/0251352 A1 | 10/2009 | Altonen et al. |
| 2009/0302782 A1 | 12/2009 | Smith |
| 2009/0315672 A1 | 12/2009 | Nantz et al. |
| 2009/0322251 A1 | 12/2009 | Hilgers |
| 2010/0012738 A1 | 1/2010 | Park |
| 2010/0031076 A1* | 2/2010 | Wan ..................... G06F 11/3006 713/340 |
| 2010/0052574 A1 | 3/2010 | Blakeley et al. |
| 2010/0052576 A1 | 3/2010 | Steiner et al. |
| 2010/0081375 A1 | 4/2010 | Rosenblatt et al. |
| 2010/0104255 A1* | 4/2010 | Yun ..................... H04N 5/765 386/207 |
| 2010/0114242 A1 | 5/2010 | Doerr et al. |
| 2010/0127821 A1 | 5/2010 | Jones et al. |
| 2010/0134341 A1 | 6/2010 | Priest |
| 2010/0138007 A1* | 6/2010 | Clark .................. H04L 12/2809 715/771 |
| 2010/0141153 A1 | 6/2010 | Recker et al. |
| 2010/0207532 A1 | 8/2010 | Mans |
| 2010/0207759 A1 | 8/2010 | Sloan et al. |
| 2010/0235008 A1 | 9/2010 | Forbes, Jr. et al. |
| 2010/0238001 A1 | 9/2010 | Veskovic |
| 2010/0238003 A1 | 9/2010 | Chan et al. |
| 2010/0244706 A1 | 9/2010 | Steiner et al. |
| 2010/0262296 A1 | 10/2010 | Davis et al. |
| 2010/0289430 A1 | 11/2010 | Stelzer et al. |
| 2010/0303099 A1 | 12/2010 | Rieken |
| 2011/0006908 A1 | 1/2011 | Frantz |
| 2011/0012738 A1 | 1/2011 | Nakamura et al. |
| 2011/0039137 A1 | 2/2011 | Engle et al. |
| 2011/0043163 A1 | 2/2011 | Baarman |
| 2011/0046792 A1 | 2/2011 | Imes et al. |
| 2011/0078411 A1 | 3/2011 | Maclinovsky et al. |
| 2011/0095622 A1 | 4/2011 | Feldstein et al. |
| 2011/0113475 A1 | 5/2011 | Garcia Morchon et al. |
| 2011/0121654 A1 | 5/2011 | Recker et al. |
| 2011/0134794 A1* | 6/2011 | Sims .................. H04L 12/2809 370/254 |
| 2011/0202910 A1 | 8/2011 | Venkatakrishnan et al. |
| 2011/0208369 A1 | 8/2011 | Yang et al. |
| 2011/0244798 A1 | 10/2011 | Diagle et al. |
| 2011/0244897 A1 | 10/2011 | Shibuya |
| 2011/0282468 A1 | 11/2011 | Ashdown |
| 2011/0282495 A1* | 11/2011 | Fischer ................ H04L 67/104 709/204 |
| 2011/0305200 A1* | 12/2011 | Schoofs ................ H05B 47/16 370/328 |
| 2012/0018578 A1 | 1/2012 | Polcuch |
| 2012/0039400 A1 | 2/2012 | Rieken |
| 2012/0086561 A1 | 4/2012 | Ilyes et al. |
| 2012/0086562 A1 | 4/2012 | Steinberg |
| 2012/0091910 A1 | 4/2012 | Zhang et al. |
| 2012/0093039 A1 | 4/2012 | Rofougaran et al. |
| 2012/0094658 A1 | 4/2012 | Macias et al. |
| 2012/0108230 A1 | 5/2012 | Stephanian |
| 2012/0158203 A1 | 6/2012 | Feldstein |
| 2012/0163663 A1 | 6/2012 | Masoud et al. |
| 2012/0175969 A1 | 7/2012 | Maughan et al. |
| 2012/0235504 A1 | 9/2012 | Kesler et al. |
| 2012/0235579 A1 | 9/2012 | Chemel et al. |
| 2012/0239963 A1 | 9/2012 | Smith |
| 2012/0248993 A1 | 10/2012 | Lin |
| 2012/0250831 A1 | 10/2012 | Gorecki, Jr. |
| 2012/0254961 A1 | 10/2012 | Kim et al. |
| 2012/0257543 A1 | 10/2012 | Baum et al. |
| 2012/0274670 A1 | 11/2012 | Lee et al. |
| 2012/0275391 A1 | 11/2012 | Cui et al. |
| 2012/0303768 A1 | 11/2012 | Fiennes |
| 2012/0306621 A1 | 12/2012 | Muthu |
| 2012/0315848 A1 | 12/2012 | Smith et al. |
| 2012/0322370 A1 | 12/2012 | Lee |
| 2012/0328302 A1 | 12/2012 | Iizuka et al. |
| 2013/0010018 A1 | 1/2013 | Economy |
| 2013/0014224 A1 | 1/2013 | Graves et al. |
| 2013/0026947 A1 | 1/2013 | Economy et al. |

(56) References Cited

U.S. PATENT DOCUMENTS

| | | | |
|---|---|---|---|
| 2013/0030589 A1 | 1/2013 | Pessina et al. | |
| 2013/0051375 A1 | 2/2013 | Chemishkian et al. | |
| 2013/0063042 A1* | 3/2013 | Bora | H05B 45/20 315/292 |
| 2013/0073431 A1 | 3/2013 | Suro et al. | |
| 2013/0100855 A1 | 4/2013 | Jung et al. | |
| 2013/0134793 A1 | 5/2013 | Mohammediyan et al. | |
| 2013/0187563 A1 | 7/2013 | Sasai et al. | |
| 2013/0211844 A1 | 8/2013 | Sadwick | |
| 2013/0223279 A1 | 8/2013 | Tinnakornsrisuphap et al. | |
| 2013/0261821 A1 | 10/2013 | Lu et al. | |
| 2013/0286889 A1 | 10/2013 | Cherian et al. | |
| 2013/0322281 A1 | 12/2013 | Ludlow et al. | |
| 2014/0070919 A1 | 3/2014 | Jackson et al. | |
| 2014/0106735 A1 | 4/2014 | Jackson et al. | |
| 2014/0163742 A1 | 6/2014 | Element | |
| 2014/0163751 A1 | 6/2014 | Davis et al. | |
| 2014/0175875 A1 | 6/2014 | Newman, Jr. et al. | |
| 2014/0177469 A1 | 6/2014 | Neyhart | |
| 2014/0180487 A1 | 6/2014 | Bull | |
| 2014/0265568 A1* | 9/2014 | Crafts | H05B 47/19 307/24 |
| 2014/0277805 A1 | 9/2014 | Browne, Jr. et al. | |
| 2014/0289825 A1 | 9/2014 | Chan et al. | |
| 2014/0304773 A1 | 10/2014 | Woods et al. | |
| 2014/0375421 A1 | 12/2014 | Morrison et al. | |
| 2014/0375428 A1 | 12/2014 | Park | |
| 2015/0017973 A1 | 1/2015 | Gold | |
| 2015/0097666 A1 | 4/2015 | Boyd et al. | |
| 2015/0200925 A1 | 7/2015 | Lagerstedt et al. | |
| 2015/0239353 A1 | 8/2015 | Cregut | |
| 2015/0259078 A1 | 9/2015 | Filipovic et al. | |
| 2015/0342011 A1 | 11/2015 | Brochu et al. | |
| 2016/0119032 A1 | 4/2016 | Choi et al. | |
| 2016/0148449 A1 | 5/2016 | God et al. | |
| 2016/0149411 A1 | 5/2016 | Neyhart | |
| 2016/0254699 A1 | 9/2016 | Carmen, Jr. | |
| 2016/0285550 A1 | 9/2016 | Economy | |
| 2017/0064798 A1 | 3/2017 | Economy et al. | |
| 2017/0264452 A1 | 9/2017 | Vollmer et al. | |
| 2018/0168019 A1 | 6/2018 | Baker et al. | |
| 2018/0198893 A1 | 7/2018 | Newman, Jr. et al. | |
| 2018/0205460 A1 | 7/2018 | Economy | |
| 2018/0324933 A1 | 11/2018 | Hammett et al. | |
| 2019/0006846 A1 | 1/2019 | Neyhart | |
| 2020/0092003 A1 | 3/2020 | Economy | |
| 2020/0195460 A1 | 6/2020 | Browne, Jr. et al. | |
| 2024/0032177 A1* | 1/2024 | Karc | H05B 47/19 |
| 2024/0348707 A1* | 10/2024 | Newman, Jr. | H04L 12/2803 |

FOREIGN PATENT DOCUMENTS

| | | |
|---|---|---|
| DE | 102006046489 A1 | 4/2008 |
| DE | 102009056152 A1 | 6/2011 |
| EP | 0767551 B1 | 8/2002 |
| EP | 1727399 A2 | 11/2006 |
| EP | 1693991 B1 | 7/2009 |
| GB | 2533675 A | 6/2016 |
| JP | 2011-023819 A | 2/2011 |
| WO | 1999046921 A2 | 9/1999 |
| WO | 2001052515 A1 | 7/2001 |
| WO | 2001074045 A1 | 10/2001 |
| WO | 2002071689 A2 | 9/2002 |
| WO | 2001052515 A9 | 10/2002 |
| WO | 2002071689 A3 | 11/2002 |
| WO | 2003007665 A1 | 1/2003 |
| WO | 2004023849 A1 | 3/2004 |
| WO | 2004056157 A1 | 7/2004 |
| WO | 2006133172 A2 | 12/2006 |
| WO | 2007069129 A2 | 6/2007 |
| WO | 2008040454 A2 | 4/2008 |
| WO | 2008092082 A2 | 7/2008 |
| WO | 2008095250 A1 | 8/2008 |
| WO | 2009010916 A2 | 1/2009 |
| WO | 2010027412 A1 | 3/2010 |
| WO | 2010143130 A1 | 12/2010 |
| WO | 2011064244 A2 | 6/2011 |
| WO | 2018099793 A1 | 6/2018 |

OTHER PUBLICATIONS

U.S. Appl. No. 16/813,148, filed Mar. 9, 2020.
U.S. Appl. No. 16/813,022, filed Mar. 9, 2020.
"CEDIA 2012: Crestron Demos Home Technology Control Solutions with NFC-Enabled Mobile Device" Available at http://www.youtube.com/watch?=qXwoTJX14BE retrieved on Aug. 13, 2013, Video provided on CD Media Sep. 8, 2012 pp. 1-2.
"Creston NFC Demo at CEDIA Expo 2012" Available at http://www.youtube.com/watch?v=FQ1f5vxwqnl Retrieved on Aug. 13, 2013 Transcript of Video provided on CD Media Sep. 10, 2012 pp. 1-2.
"SimpleLink™ CC3000 Boosterpack Jump-Starts the Internet of things" Available at http://www.youtube.com/watch?v=6kh0g0KMIQc retrieved on Aug. 13, 2013 Transcript of video on CD Media Jun. 6, 2013 1 page.
Black Rich "Clear Connect RF Technology" Lutron Electronics Company Inc. Aug. 2009, 16 pages.
Gade Lisa "PalmOne Treo 600 Palm OS Smartphone from Sprint PCS" Oct. 28, 2013 Mobile Tech Review Document Available at: <http://www.mobiletechreview.com/treo_600.htm> Retrieved on May 21 2013, 4 pages.
Gade Lisa "PalmOne Treo 650 Palm OS Smartphone: CDMA (Sprint) and GSM Versions" Dec. 10, 2004 Mobile Tech Review Document Available at: <http://web.archive.org/web/20050404004524/http://www.mobiletechreview.com/Treo_650.htm> Retrieved on May 21, 2013, 6 Pages.
JSJSDesigns PLC "JS JS Products" Available at: <http://web.archive.org/web/20101111085355/http://www.jsjsdesigns.com/product/html> Nov. 11, 2010, 4 pages.
Myers Dana "SimpleLink™ Wi-Fi® CC3000-First Time Config Using PC" Available at http://www.youtube.com/watch?v=10U4NTgkjLs Retrieved on Aug. 13, 2013 Transcript of Video provided on CD Media Dec. 18, 2012, pp. 1-2.
Myers Dana "SimpleLink™ Wi-Fi® CC3000-First Time Config with Smartphone" Available at http://www.youtube.com/watch?v=fxP9hnZysgo Retrieved on Aug. 13, 2013 Transcript of Video provided on CD Media Sep. 19, 2012, pp. 1-2.
Rusybrick Inc. "iPhone 4 Morse Code Transmission App" Available at <http://www.rustybrick.com/iphone-morse-code.php> Jan. 4, 2011, 3 pages.
Texas Instruments "CC3000 Smart Config" Available at http://processors.wiki.ti.com/index.php/CC3000_Smart_Config Retrieved on Feb. 2, 2016, pp. 1-5.
U.S. Appl. No. 16/102,357, filed Aug. 13, 2018.
U.S. Appl. No. 16/030,310, filed Jul. 9, 2018.
U.S. Appl. No. 16/113,548, filed Aug. 27, 2018.
International Patent Application No. PCT/US2012/045067, International Search Report dated Oct. 29, 2012, 6 pages.
International Patent Application No. PCT/US2012/045114, International Search Report dated Oct. 24, 2012, 5 pages.
International Patent Application No. PCT/US2012/45096, International Search Report dated Apr. 2, 2013, 8 pages.

* cited by examiner

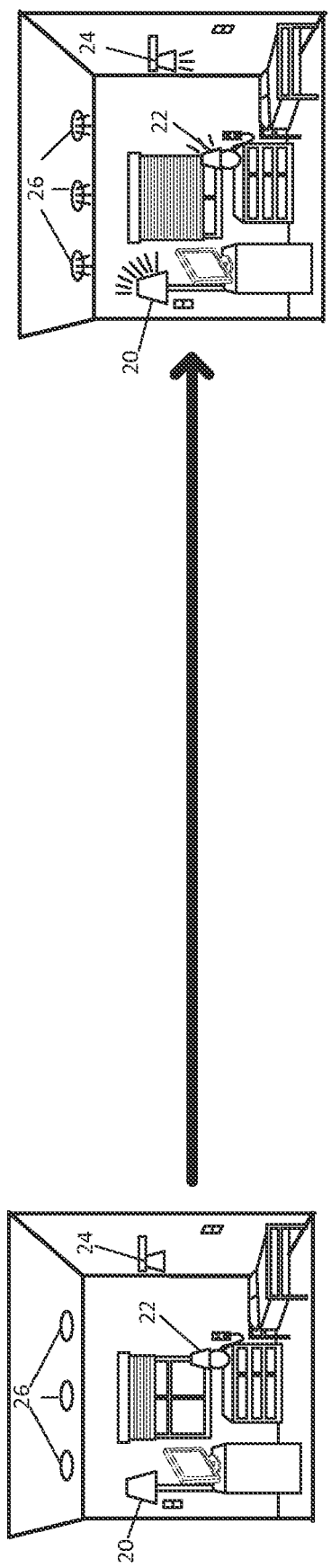

OPERATIONAL COORDINATION OF LOAD CONTROL DEVICES FOR CONTROL OF ELECTRICAL LOADS

CROSS-REFERENCE TO RELATED APPLICATIONS

This application is a continuation of U.S. patent application Ser. No. 16/030,310 filed Jul. 9, 2018, now U.S. Pat. No. 11,301,013, issued Apr. 12, 2022; which is a continuation of U.S. patent application Ser. No. 13/793,870 filed Mar. 11, 2013, now U.S. Pat. No. 10,019,047 issued Oct. 2, 2018; all of which claim the benefit of commonly assigned U.S. Provisional Application No. 61/745,378, filed on Dec. 21, 2012, and titled "Operational Coordination of Load Control Devices," the entire contents of which being hereby incorporated by reference herein, for all purposes.

BACKGROUND

A load control device may control the amount of power delivered to an electrical load. Load control devices include, for example, lighting control devices (such as wall-mounted dimmer switches and plug-in lamp dimmers), motor control devices (for motor loads), temperature control devices, motorized window treatments, and remote controls. FIG. 1A is an exemplary environment 10 that may utilize a number of load control devices. In FIG. 1A, the illustrated load control devices may control lighting loads 12, smart thermostats 14, and/or motorized window treatments 16 in a typical (household) environment. Typically, a load control device, such as a dimmer switch, may be coupled in a series electrical connection between an alternating-current (AC) power source and the electrical load, such as one of the lighting loads 12, to control the power delivered from the AC power source to the electrical load.

Some load control devices are operable to transmit and receive wireless signals, such as radio-frequency (RF) or infrared (IR) signals, to thus provide for wireless control of the corresponding loads. One example of an RF lighting control system is disclosed in commonly-assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, the entire disclosure of which is hereby incorporated by reference.

Wi-Fi technology (e.g., the 802.11 family of wireless technologies) is an example technology that may be used with RF wireless communication systems, such as load control systems for controlling load control devices and electrical loads. Examples of Wi-Fi-enabled load control devices include those described in commonly-assigned U.S. application Ser. No. 13/538,555, filed Jun. 29, 2012, titled LOAD CONTROL DEVICE HAVING INTERNET CONNECTIVITY, the contents of which is hereby incorporated by reference herein in its entirety, for all purposes.

Wi-Fi technology may be used in a contention-based shared network in which the wireless resources are shared among the users—each vying for the opportunity to transmit and receive information on a common channel. This competition can cause variation in communication latency, where certain transmissions are made with relatively low latency and other transmissions may have to wait much longer before the channel is available for transmission. This variation in latency is particularly problematic when communicating commands to load control devices.

To illustrate, as shown in FIGS. 1B and 1C, a room in a house may have four different lighting loads, e.g., a floor lamp 20, a table lamp 22, a sconce 24, and recessed ceiling lights 26. Each lighting load may be controlled by a different load control device. When wireless commands are sent to each device with varying latency, each device may execute those commands at different times. And, rather than all of the lights pleasantly coming on or off together, as shown in FIG. 1B, there is an unpleasant randomness to the lights coming on or off at different times, as shown in FIG. 1C. Here, the recessed ceiling lights 26 are the first to respond, then the sconce 24 and table lamp 22, followed by the floor lamp 20. This unfortunate problem may be known as the "pop-corn" effect, and it is an undesirable aesthetic for the operation of the system.

Wi-Fi-enabled devices may communicate using a carrier-service multiple access (CSMA) communication protocol. CSMA protocols often experience multi-path issues, propagation delays, and the burdens of a shared protocol (e.g., having to accommodate IP packets for a large number of devices, including transient devices, that introduce IP packets at various and unpredictable times). For example, devices that may use CSMA protocols verify the absence of other traffic before transmitting on the shared transmission medium. Because of such issues that may be encountered with Wi-Fi technology, among other reasons, when a user commands a dimming action of the floor lamp 20, the table lamp 22, the sconce 24, and the ceiling lights 26 (e.g. via Wi-Fi transmitted commands to respective dimmer switches that may control those lighting loads)—the user may observe the popcorn effect. For example, a dimmer switch for the floor lamp 20 may turn on the floor lamp 20 one or more seconds before a dimmer switch for the floor lamp 22 may turn on the floor lamp 22—which may occur one or more seconds before a dimmer switch for the sconce 24 may turn on the sconce 24.

The wireless system would have an increased benefit from the ability to leverage wireless networks with varying latency (such as contention-based shared wireless technologies, like Wi-Fi technology for example) if the pop-corn effect could be mitigated and/or eliminated.

SUMMARY

A device configured to control an electrical load may comprise a controller and a first wireless communication circuit that may be operable to communicate on a first wireless communication network via a first protocol. The first communication circuit may be in communication with the controller. The controller may receive a first signal via the first wireless communication circuit and via the first protocol. The first signal may include a power control command that may include a power control adjustment for the device and a synchronization condition. The synchronization condition may be such that the power adjustment of the device maybe coordinated with other devices configured to control electrical loads, or the like. The controller may also determine that a synchronization condition status is either satisfied or unsatisfied. And the controller may implement the power control adjustment upon determining that the synchronization condition status is satisfied.

One or more techniques for controlling power delivered from an AC power source to one or more electrical loads are contemplated. Techniques may include identifying a first command to adjust more than one electrical load and determining a respective network address of one or more load control devices capable of respectively adjusting the more than one electrical load according to the command. Techniques may also include determining a synchronization condition for the one or more load control devices. The synchronization condition coordinating the respective one or more load control devices may be such that each of the respective adjustments of the more than one electrical load may be made within a predetermined period of time. Techniques may also include transmitting a second command via the respective network addresses to each of the one or more load control devices, where the second command may cause the respective one or more load control devices to implement the respective load control adjustments upon the synchronization condition being satisfied.

An apparatus that may be in communication with a plurality of load control devices is contemplated. Each of the plurality of load control devices may respectively control the power delivered to a plurality of electrical loads. The apparatus may comprise a controller and a first wireless communication interface (e.g. circuit) that may be operable to communicate on a first wireless communication network via a first protocol. The first communication interface may be in communication with the controller. The apparatus may also comprise a second communication interface that may be operable to communicate on a second communication network via a second protocol. The second communication interface may be in communication with the controller. The controller may be operable to receive a first signal via the first wireless communication interface and via the first protocol and the first signal may include a power control command. The power control command may include a respective power control adjustment for one or more of the plurality of load control devices. The controller may also be operable to identify the respective one or more of the plurality of load control devices for which the power control command includes the respective power control adjustment. The controller may also be operable to transmit a respective second signal to the identified one or more of the plurality of load control devices via the second communication interface and via the second protocol. Each respective second signal may include the respective power control adjustment for the respective one or more of the plurality of load control devices.

A load control device that may comprise a controller is contemplated. The controller may be configured, at least in part, to receive a first command to perform an adjustment of a connected electrical load. The controller may also be configured to receive a second command to perform an adjustment of the connected electrical load. The second command may be at least one of a same adjustment of the connected electrical load as the first command, or a different adjustment of the connected electrical load as the first command. The controller may be configured to implement the first command and to determine a difference in time between the receipt of the second command and the implementation of the first command. The controller may also be configured to disregard the second command upon at least one of the second command being received before the implementation of first command, or the receipt of the second command being before the expiration of a predetermined period of time following the implementation of the first command.

BRIEF DESCRIPTION OF THE DRAWINGS

FIGS. 1B and 1C are exemplary environments illustrating the popcorn effect in home automation loads.

DETAILED DESCRIPTION

Figure 1A:
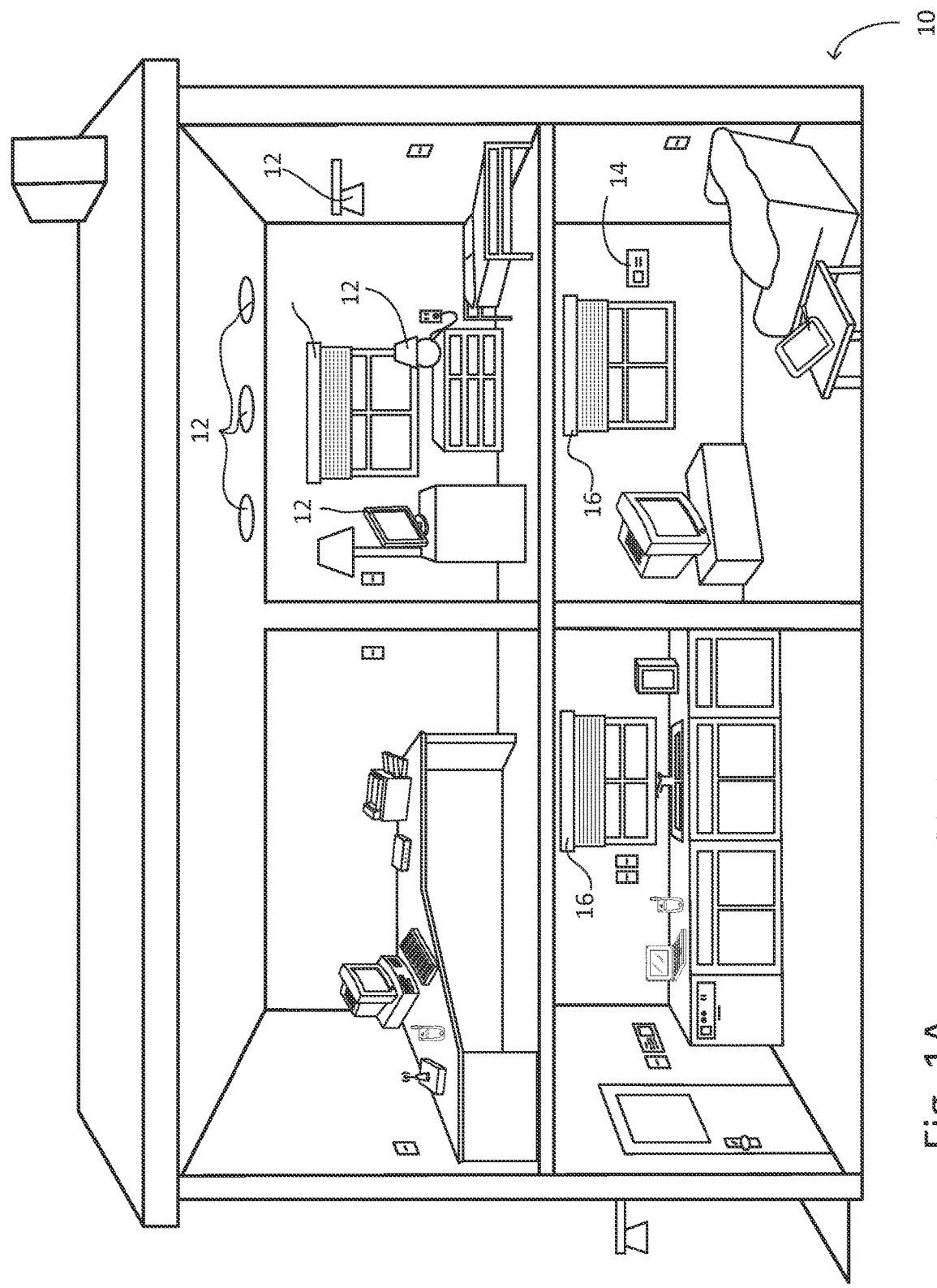
FIG. 1A is an exemplary environment that may utilize a number of load control devices.
Figure 1C:
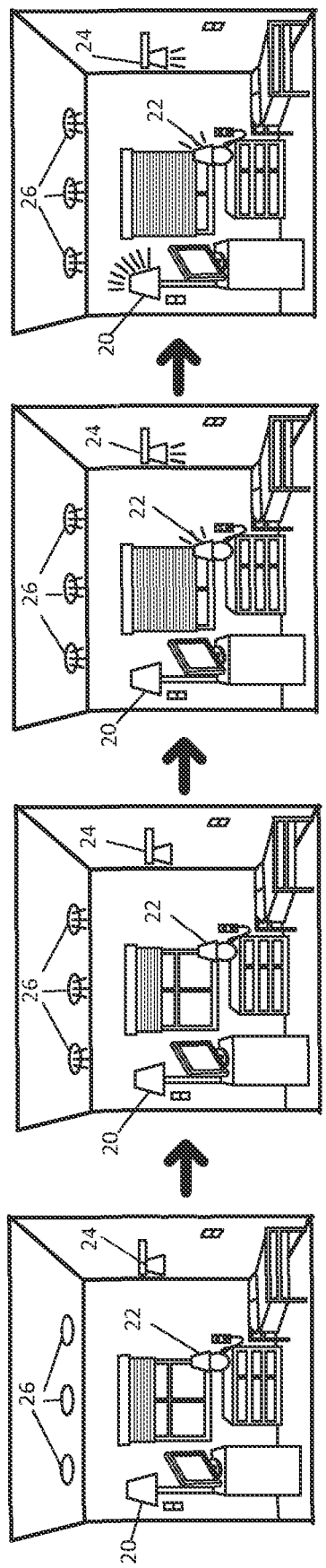
Figure 2:
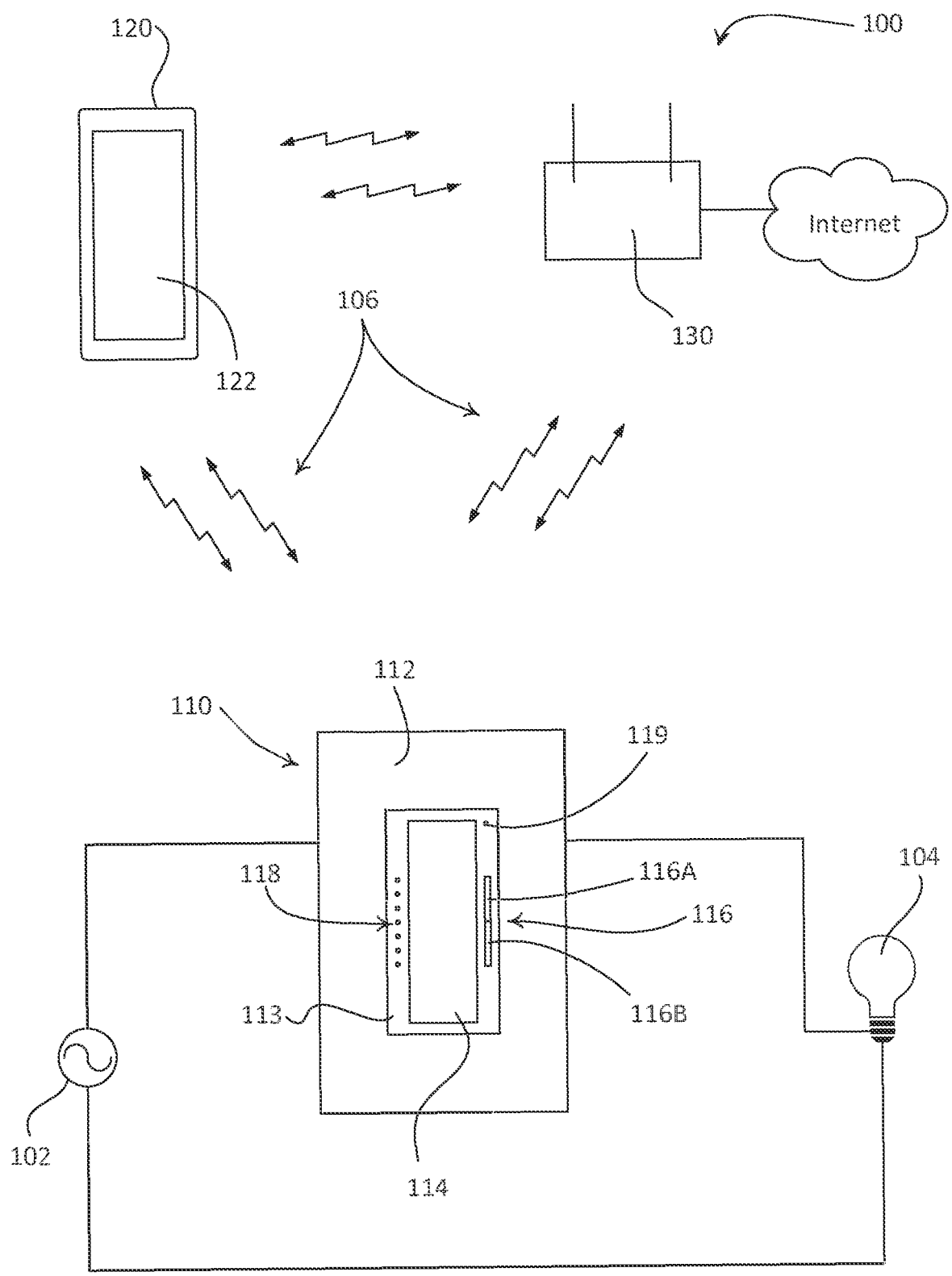
FIG. 2 is a simple diagram of a radio-frequency (RF) lighting control system comprising a dimmer switch and a wireless control device, such as a smart phone.

FIG. 2 is a simple diagram of a radio-frequency (RF) lighting control system 100 that includes a dimmer switch 110 and a wireless control device 120. The wireless control device 120 may be any device capable of performing wireless communications, such as, a smart phone (e.g., an iPhone® smart phone, an Android® smart phone, or a Blackberry® smart phone), a personal computer, a laptop, a wireless-capable media device (e.g., an MP3 player, a gaming device, or a television), or a tablet device, (e.g., an iPad® hand-held computing device), a Wi-Fi or wireless-communication-capable television, or any other suitable Internet-Protocol-enabled device.

The wireless control device 120 may be operable to transmit digital messages to the dimmer switch 110 in one or more Internet Protocol (IP) packets. The Internet Protocol layer is responsible for addressing hosts and routing datagrams (i.e., packets) from a source host to a destination host across one or more IP networks. For this purpose, the Internet Protocol layer defines an addressing system that has two functions: identifying hosts and providing a logical location service. This is accomplished by defining standard datagrams and a standard addressing system.

Each datagram has two components: a header and a payload. The IP header includes the source IP address, destination IP address, and other meta-data needed to route and deliver the datagram. The payload is the data that is transported.

The wireless control device 120 may transmit the digital messages (e.g., the IP packets) via RF signals 106 either directly or via a wireless network that includes a standard wireless router 130. For example, the wireless control device 120 may transmit the RF signals 106 directly to the dimmer switch 110 via a point-to-point communication link, e.g., a Wi-Fi communication link, such as an 802.11 wireless local area network (LAN), or other direct wireless communication link, such as a Wi-MAX communication link or a Bluetooth® communication link. This point-to-point communication may be performed using a standardized communication, e.g., Wi-Fi Direct communication, or any non-standardized communication that allows a wireless device to connect to another wireless device without the use of a wireless access point. For example, the wireless control device 120 and/or the dimmer switch 110 may download a software access point (AP) that provides a protected wireless communication between the devices.

The wireless control device 120 may also transmit RF signals 106 to the dimmer switch 110 via the wireless network (i.e., via the wireless router 130). The wireless network may enable wireless communications via one or more wireless communications links, e.g., a Wi-Fi communications link, a Wi-MAX communications link, a Bluetooth® communications link, a cellular communications link, a television white space (TVWS) communication link, or any combination thereof. For example, the wireless control device 120 may communicate with a network server via a first wireless communications link (e.g., a cellular communications link), while the dimmer switch 110 communicates with the network server via a second communications link (e.g., a Wi-Fi communications link). Alternatively or additionally, the wireless control device 120 and the dimmer switch 110 may communicate with the network via the same type of communication link. The lighting control system 100 may also include a femtocell, a Home Node B, and/or other network entity for facilitating the configuration and operation of the lighting control system and for allowing wireless communications and connection to the Internet.

The dimmer switch 110 may be coupled in series electrical connection between an AC power source 102 and a lighting load 104 for controlling the amount of power delivered to the lighting load. The dimmer switch 110 may be wall-mounted in a standard electrical wallbox, or alternatively implemented as a table-top load control device. The dimmer switch 110 comprises a faceplate 112 and a bezel 113 received in an opening of the faceplate. The dimmer switch 110 further comprises a toggle actuator 114 and an intensity adjustment actuator 116. Actuations of the toggle actuator 114 toggle, e.g., alternatingly turn off and on, the lighting load 104. Actuations of an upper portion 116A or a lower portion 116B of the intensity adjustment actuator 116 may respectively increase or decrease the amount of power delivered to the lighting load 104 and thus increase or decrease the intensity of the lighting load 104 from a minimum (i.e., low-end) intensity (e.g., approximately 1-10%) to a maximum (i.e., high-end) intensity (e.g., approximately 100%). A plurality of visual indicators 118, e.g., light-emitting diodes (LEDs), may be arranged in a linear array on the left side of the bezel 113. The visual indicators 118 are illuminated to provide visual feedback of the intensity of the lighting load 104. An example of a dimmer switch having a toggle actuator and an intensity adjustment actuator is described in greater detail in U.S. Pat. No. 5,248,919 ("the 919 patent"), issued Sep. 28, 1993, entitled LIGHTING CONTROL DEVICE, the entire disclosure of which is hereby incorporated by reference. Alternatively, the dimmer switch 110 could be replaced by an electronic switch for simply turning the lighting load 104 on and off. The electronic switch may include a single visual indicator, e.g., the middle indicator of the visual indicators 118 of the dimmer switch 110.

The dimmer switch 110 may include an optical receiver 119. The optical receiver 119 may be used to receive optical signals from the wireless control device 120. Optical signals may be free-space optical communications or communications via physical connections. For example, free space optical communications may include communications via air, while physical optical communications may include communications via optical fiber cable or an optical transmission pipe. The optical signals may also be included in visible light, e.g., a flashing light, or non-visible light, e.g., infrared, spectrums.

The optical signals may provide instructions for programming and/or adjusting the operating parameters (e.g., the low-end intensity and the high-end intensity) of the dimmer switch 110. For example, the optical signals may be used to configure the dimmer switch such that the dimmer switch 110 is operable to receive the RF signals 106 from the wireless control device 120 as will be described in greater detail below. The optical signals may also be used to control or program the lighting configurations of the dimmer switch 110. And, though what is described herein may be described with respect to using optical signals or other signals to program or control a dimmer switch from a wireless control device, such signals may be used to program or control any device that is capable of receiving instructions via such optical or other signals, such as shades, thermostats, plug-in devices, or the like. Examples of methods of communicating optical signals between the dimmer switch 110 and the wireless control device 120 are described in greater detail in commonly assigned U.S. patent application Ser. No. 13/538,665, filed on Jun. 29, 2012, titled METHOD OF OPTICALLY TRANSMITTING DIGITAL INFORMATION FROM A SMART PHONE TO A CONTROL DEVICE, the entire disclosure of which is hereby incorporated by reference.

Wireless load control devices are described in greater detail in commonly-assigned U.S. Pat. No. 5,838,226, issued Nov. 17, 1998, entitled COMMUNICATION PROTOCOL FOR TRANSMISSION SYSTEM FOR CONTROLLING AND DETERMINING THE STATUS OF ELECTRICAL DEVICES FROM REMOTE LOCATIONS; U.S. Pat. No. 6,803,728, issued Oct. 12, 2004, entitled SYSTEM FOR CONTROL OF DEVICES; U.S. patent application Ser. No. 12/033,223, filed Feb. 19, 2008, entitled COMMUNICATION PROTOCOL FOR A RADIO-FREQUENCY LOAD CONTROL SYSTEM; and U.S. patent application Ser. No. 13/234,573, filed Sep. 16, 2011, entitled DYNAMIC KEYPAD FOR CONTROLLING ENERGY-SAVINGS SETTINGS OF A LOAD CONTROL SYSTEM; the entire disclosures of which are hereby incorporated by reference.

The wireless control device 120 has a visual display 122, which may comprise a touch screen having, for example, a capacitive touch pad displaced overtop the visual display, such that the visual display may display soft buttons that may be actuated by a user. Alternatively, the wireless control device 120 may comprise a plurality of hard buttons (e.g., physical buttons) in addition to the visual display 122. The wireless control device 120 may download a product control application for allowing the user to control the lighting load 104. In response to actuations of the displayed soft buttons or hard buttons, the wireless control device 120 transmits digital messages to the dimmer switch 110 directly or through other wireless communications described herein. For example, the digital messages may be transmitted via Wi-Fi communication using the wireless router 130. The dimmer switch 110 may adjust the intensity of the lighting load 104 in response to commands included in the digital messages, such that the dimmer switch controls the lighting load in response to actuations of the soft buttons or hard buttons of the wireless control device 120.

In addition, the wireless control device 120 may be controlled to transmit optical signals, near field communication (NFC) signals, or RF signals according to a proprietary RF communication protocol (such as, for example, the Clear Connect™ protocol) as described herein. For example, the visual display 122 may be controlled to transmit optical signals to the optical receiver 119 of the dimmer switch 110 (as will be described in greater detail below).

The dimmer switch 110 and the wireless control device 120 may both be assigned a unique address for wireless communications via the wireless network (i.e., via the wireless router 130) as described herein. For example, where wireless communications are performed using a Wi-Fi communication link, a Media Access Control (MAC) address may be assigned (e.g., during manufacture). The wireless control device 120 may connect to the wireless LAN via the wireless router 130 using standard procedures. The wireless control device 120 is assigned an Internet Protocol (IP) address upon connecting to the wireless LAN. The wireless control device 120 may store the service set identifier (SSID) and the SSID password of the wireless LAN. After obtaining the IP address, the wireless control device 120 is able to assign an IP address (e.g., different from the IP address of the wireless control device 120) to the dimmer switch 110. Alternatively, the dimmer switch 110 may be operable to obtain the IP address from the wireless router 130 using, for example, procedures defined by the Wi-Fi Protected Setup standard.

The dimmer switch 110 may be associated with (e.g., assigned to) the wireless control device 120, such that the wireless control device may transmit commands for controlling the intensity of the lighting load 104 or programming the dimmer switch 110. Such commands may be transmitted to the dimmer switch 110 via the RF signals 106. Digital messages transmitted to and from the dimmer switch 110 may include, for example, the MAC address and the IP address of the dimmer switch 110. The dimmer switch 110 is operable to turn the lighting load 104 on and off. The dimmer switch 110 is also operable to adjust the intensity of the lighting load in response to received digital messages, including the MAC address and the IP address of the dimmer switch, for example. In addition, the wireless router 130 may be operable to receive commands for controlling the lighting load 104 from the Internet, and may wirelessly transmit corresponding digital messages to the dimmer switch 110.

The dimmer switch 110 may be assigned an IP address, an SSID, an SSID password, and/or a software access point (AP) at manufacture, such that the dimmer switch 110 may act as an AP for other communication devices in a LAN. The wireless control device 120 may recognize the dimmer switch 110 as an AP and may connect to the LAN via the dimmer switch 110. For example, the dimmer switch 110 may connect to router 130 or may perform the functions of the router 130 itself.

The dimmer switch 110 may also connect to the wireless LAN to discover other dimmer switches (not shown). The dimmer switch 110 may discover the other dimmer switches using any discovery protocol, sucgh as Bonjour, Simple Service Discovery Protocol (SSDP), Bluetooth® Service Discovery Protocol (SDP), DNS service discovery (DNS-SD), Dynamic Host Configuration Protocol (DHCP), Internet Storage Name Service (iSNS), Jini for Java objects, Service Location Protocol (SLP), Session Announcement Protocol (SAP) for RTP sessions, Simple Service Discovery Protocol (SSDP) for Universal Plug and Play (UPnP), Universal Description Discovery and Integration (UDDI) for web services, Web Proxy Autodiscovery protocol (WPAD), Web Services Dynamic Discovery (WS-Discovery), XMPP Service Discovery (XEP-0030), and/or XRDS for XRI, OpenID, OAuth, etc. Upon the dimmer switch 110 discovering one or more other dimmer switches, the dimmer switch may create a peer-to-peer network of dimmer switches capable of communicating with one another. For example, the dimmer switches may communicate programming and/or control instructions received from the wireless control device 120.

The wireless control device 120 may control the lighting load 104 by communicating instructions to the dimmer switch 110 via the RF signals 106 that cause the dimmer switch 110 to execute control instructions that have been pre-programmed on the dimmer switch 110. For example, the dimmer switch 110 may be pre-programmed at manufacture or via an update to execute the control instructions. The control instructions may include pre-configured settings (e.g., protected or locked lighting presets), instructions for raising/lowering lighting level, instructions for fading, instructions for scheduling, instructions for turning lights on/off, or any other pre-programmed instruction, for example.

The wireless control device 120 may also program the settings (i.e., the operating parameters) of the dimmer switch 110 (e.g., when the dimmer switch is in a programming mode). For example, the dimmer switch 110 may be a dimmer switch that may have a limited user interface (UI) or may not have any user interface. As such, the user interface of the wireless control device 120 may be used to program the dimmer switch 110. For example, various wireless communication links described herein, e.g., Wi-Fi signals, optical signals, near field communication (NFC) signals, or proprietary-protocol RF signals, may be used to program any of a number of programmable features provided by the dimmer switch 110. Such features may be selected via the wireless control device 120. For example, the wireless control device 120 may program the dimmer switch 110 with such features as protected or locked presets, high-end trim, low-end trim, adjustable delay, fade time, load type, performing communications via wireless communication modes (e.g., as described herein), or being compatible with different lamps. In addition, the wireless control device 120 may be operable to program the dimmer switch 110 to change between modes of operation, for example, between a switching mode, a dimming mode, and/or an electronic timer mode (i.e., a countdown timer mode). The programming signal may be a one-way or two-way serial communication with the dimmer switch 110. Examples of methods of programming the dimmer switch 110 using the wireless control device 120 are described in greater detail in commonly assigned U.S. patent application Ser. No. 13/538,615, filed Jun. 29, 2012, titled METHOD OF PROGRAMMING A LOAD CONTROL DEVICE USING A SMART PHONE, the entire disclosure of which is hereby incorporated by reference.

Figure 3A:
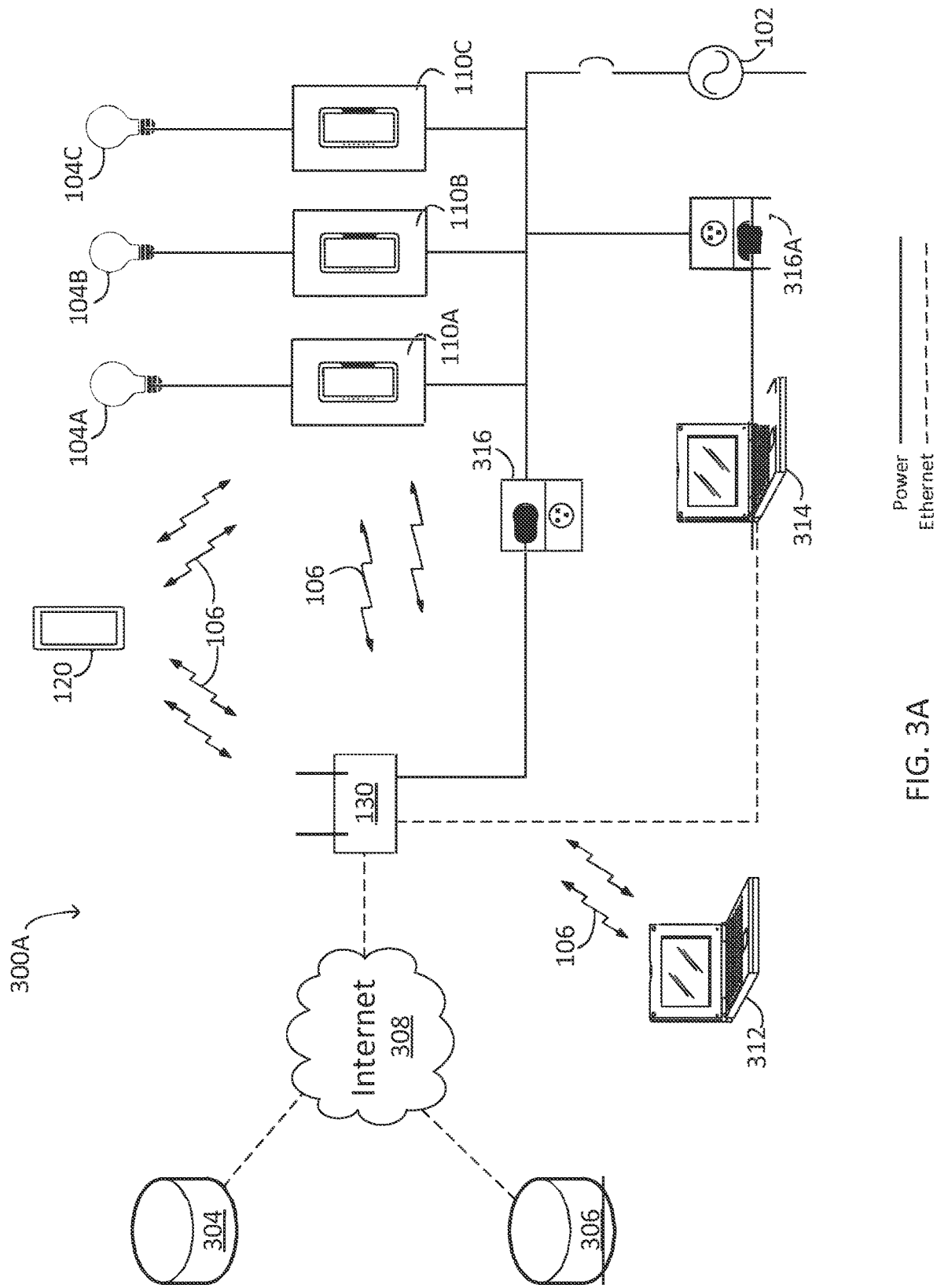
FIG. 3A is a diagram of a first example network in which one or more contemplated techniques and/or devices may be employed.

FIG. 3A is a diagram of an exemplary network environment 300A. In FIG. 3A, the router 130 may communicate with one or more servers 304, 306 via the Internet 308, perhaps as accessed through the "cloud." For example, router 130 may establish at least one Internet Protocol (IP) connection with either server 304 and/or 306. The at least one IP connection between the router 130 and either server 304 and/or 306 may be made via a router's 130 public IP address (and the respective public IP addresses of server 304 and/or server 306). Any number of devices in FIG. 3A, such as, for example, the router 130, laptop 314, dimmer switch 110A, dimmer switch 110B, and/or dimmer switch 110C, among other devices, may be connected to the AC power supply 102, perhaps via a hardwired connection or via electrical outlets 316 and 316A, for example. Dimmer switch 110A, dimmer switch 110B, and/or dimmer switch 110C may operate lighting load 104A lighting load 104B, and/or lighting load 104C, respectively, as described previously herein.

The router 130 may establish a non-public (or private) IP address for the router 130 and may establish an IP connection and corresponding respective private IP addresses with the dimmer switch 110A, 110B, and/or 110C, and the laptops 312 and/or 314. The router 130 may coordinate one or more of the respective private IP addresses with one or more IP connections (e.g., multimedia or data streams) that are received via the router's 130 public IP address (e.g., from the server 304 and/or 306). The router 130 may coordinate one or more of the respective public IP addresses (e.g., of the server 304 and/or server 306) with one or more IP connections (e.g., multimedia or data) that are sent to the router's 130 private IP address (e.g., from the laptop 312 and/or laptop 314). The router 130 may perform such coordination via a Network Address Table (NAT) (not shown), or the like, for example.

The wireless control device 120 (among other devices with private IP addresses) may be operable to transmit and receive RF signals 106 including Internet Protocol packets directly to and from the dimmer switches 110A, 110B, and/or 110C, or to and from the dimmer switches 110A, 110B, and/or 110C via the wireless router 130. The router 130 may be operable to transmit one or more digital messages via RF signals 106 that may correspond to the RF signals 106 received from the wireless control device 120. For example, the wireless control device 120, the router 130, the laptop 312, and/or the laptop 314 may transmit and receive the RF signals 106 directly with the dimmer switch 110A, dimmer switch 110B, and/or dimmer switch 110C via a point-to-point communication, such as a Wi-Fi communication link, e.g., an 802.11 wireless local area network (LAN), or other direct wireless communication link, e.g., a Wi-MAX communication link or a Bluetooth® communication link.

Figure 4A:
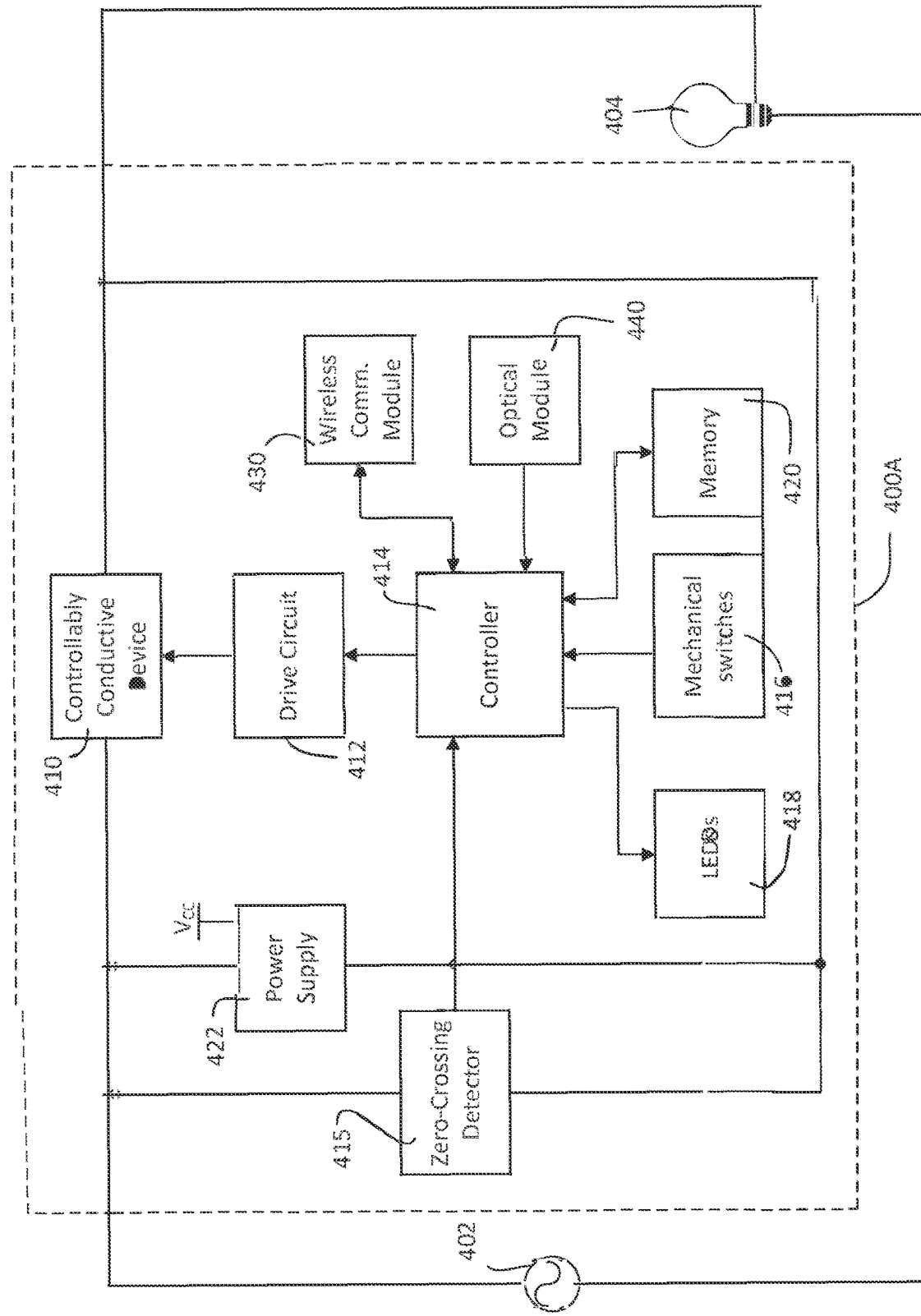
FIG. 4A is a first simplified example block diagram of the dimmer switch of the RF lighting control system of FIG. 2.

FIG. 4A is a simplified block diagram of a first example of a dimmer switch 400A (e.g., one of the dimmer switches 110A, 110B, 110B shown in FIG. 3A). The example dimmer switch 400A comprises a controllably conductive device 410 coupled in series electrical connection between an AC power source 402 and a lighting load 404 for control of the power delivered to the lighting load. The controllably conductive device 410 may comprise a relay or other switching device, or any suitable type of bidirectional semiconductor switch, such as, for example, a triac, a field-effect transistor (FET) in a rectifier bridge, or two FETs in anti-series connection. The controllably conductive device 410 includes a control input coupled to a drive circuit 412.

The dimmer switch 400A further comprises a control circuit, e.g., a controller 414, coupled to the drive circuit 412 for rendering the controllably conductive device 410 conductive or non-conductive to thus control the power delivered to the lighting load 404. The controller 414 may comprise a microcontroller, a programmable logic device (PLD), a microprocessor, an application specific integrated circuit (ASIC), a field-programmable gate array (FPGA), or any suitable processing device or control circuit. A zero-crossing detector 415 determines the zero-crossings of the input AC waveform from the AC power supply 402. A zero-crossing may be the time at which the AC supply voltage transitions from positive to negative polarity, or from negative to positive polarity, at the beginning of each half-cycle. The controller 414 receives the zero-crossing information from the zero-crossing detector 415 and provides the control inputs to the drive circuit 412 to render the controllably conductive device 410 conductive and non-conductive at predetermined times relative to the zero-crossing points of the AC waveform.

The controller 414 receives inputs from mechanical switches 416 that are mounted on a printed circuit board (not shown) of the dimmer switch 400A, and are arranged to be actuated by actuators (e.g., the toggle actuator 114 and the intensity adjustment actuator 116). The controller 414 also controls light-emitting diodes 418, which are also mounted on the printed circuit board. For example, the light emitting diodes 418 may be arranged to illuminate the visual indicators (e.g., visual indicators 118) on the front surface of the dimmer switch 400A, for example, through a light pipe structure (not shown). The controller 414 is also coupled to a memory 420 for storage of unique identifiers (e.g., the MAC address and the IP address) of the dimmer switch 400A, the SSID and the SSID password of the wireless LAN, instructions for controlling the lighting load 404, programming instructions for communicating via a wireless communication link, or the like. The memory 420 may be implemented as an external integrated circuit (IC) or as an internal circuit of the controller 414. A power supply 422 generates a direct-current (DC) voltage $V_{CC}$ for powering the controller 414, the memory 420, and other low-voltage circuitry of the dimmer switch 400A.

The dimmer switch 400A further includes a wireless communication module 430 for transmitting and receiving RF signals to and from a wireless device (e.g., the wireless control device 120 and/or the wireless router 130). For example, the wireless communication module 430 may be configured to communicate via a Wi-Fi communication link, a Wi-MAX communication link, a Clear Connect™ communication link, and/or a Bluetooth® communication link. When the wireless communication module 430 comprises a Wi-Fi module, the controller 414 is operable to control the lighting load 404 in response to received digital messages in Wi-Fi packets (i.e., Internet Protocol packets received via the Wi-Fi signals). The wireless communication module 430 may comprise one or more RF transceivers and one or more antennas. Examples of antennas for wall-mounted dimmer switches are described in greater detail in U.S. Pat. No. 5,736,965, issued Apr. 7, 1998, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference.

The dimmer switch 400A further comprises an optical module 440, such as an optical signal receiving circuit for example. The optical module 440 may be optically coupled to an optical receiver (e.g., the optical receiver 119). The optical module 440 may be coupled to the optical receiver 119 on the front surface of the dimmer switch 400A, for example, through a light pipe (not shown), such that the optical module 440 may receive the optical signals from the wireless control device 120 via the light pipe. For example, the optical module 440 may comprise a photodiode (not shown) that is responsive to the optical signals transmitted by a wireless device (e.g., the wireless control device 120). In addition, the photodiode of the optical module 440 may be controlled by the controller 414, so as to transmit optical signals to the wireless control device 120 (as will be described in greater detail below), for example.

The controller 414 may control the controllably conductive device 410 in response to the digital messages received via the optical signals and/or the RF signals. For example, the controller 414 may determine the module from which the signals are received, e.g., from the wireless communication module 430 and/or 432 or the optical module 440, and the controllably conductive device 410 may be controlled based on those signals. The controller 414 may also transmit digital messages to a wireless device (e.g., the wireless control device 120) via optical signals or the RF signals. For example, the controller 414 of the dimmer switch 400A may be used to transmit digital messages to the wireless control device 120 via wireless communication. The digital messages may include alerts and/or feedback and status information regarding the lighting load 404. The digital messages may also include error messages or indications as to whether the dimmer switch 400A is able to communicate via a wireless communication link or RF signal, for example.

Figure 3B:
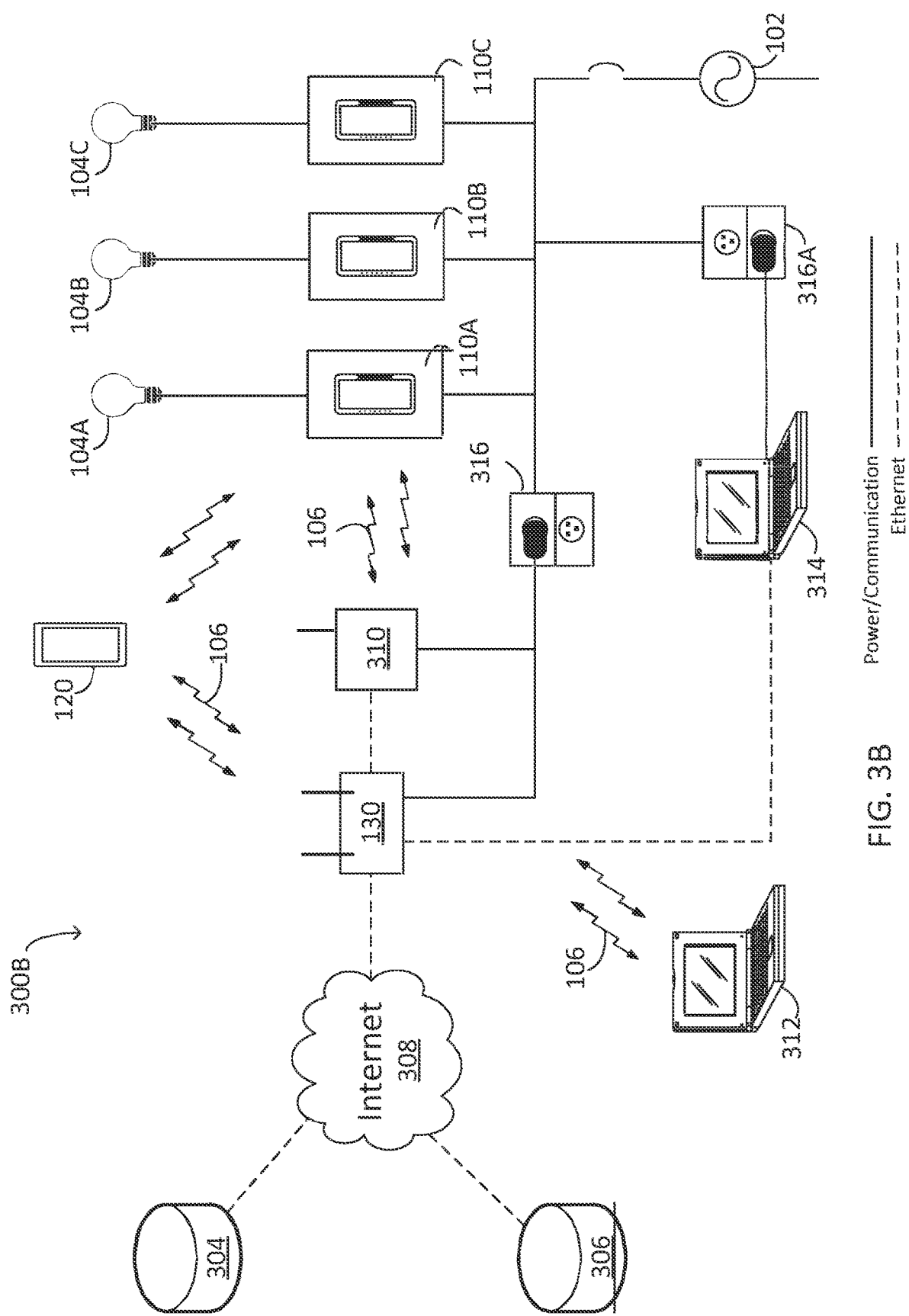
FIG. 3B is a diagram of a second example network in which one or more contemplated techniques and/or devices may be employed.

FIG. 3B is a diagram of an exemplary network environment 300B. In FIG. 3B, the router 130 may communicate with one or more servers 304, 306 via the Internet 308, perhaps as accessed through the "cloud." For example, router 130 may establish at least one Internet Protocol (IP) connection with either server 304 and/or 306. The at least one IP connection between the router 130 and either server 304 and/or 306 may be made via a router's 130 public IP address (and the respective public IP addresses of server 304 and/or server 306). A gateway device 310 may communicate with the router 130 via a wired or wireless connection. Any number of devices in FIG. 3B, such as, for example, the router 130, the gateway device 310, laptop 314, dimmer switch 110A, dimmer switch 110B, and/or dimmer switch 110C, among other devices, may be connected to the AC power supply 102, perhaps via a hardwired connection or via electrical outlets 316 and 316A, for example. Dimmer switch 110A, dimmer switch 110B, and/or dimmer switch 110C may operate lighting load 104A lighting load 104B, and/or lighting load 104C as described previously herein.

The router 130 may establish a non-public (or private) IP address for the router 130 and may establish an IP connection and corresponding respective private IP addresses with the dimmer switches 110A, 110B, and/or 110C, the gateway device 310, and the laptops 312 and/or 314. The router 130 may coordinate one or more of the respective private IP addresses with one or more IP connections (e.g., multimedia or data streams) that are received via the router's 130 public IP address (e.g., from the server 304 and/or 306). The router 130 may coordinate one or more of the respective public IP addresses (e.g., of the server 304 and/or server 306) with one or more IP connections (e.g., multimedia or data) that are sent to the router's 130 private IP address (e.g., from the gateway device 310, laptop 312, and/or laptop 314). The router 130 may perform such coordination via a Network Address Table (NAT) (not shown), or the like, for example.

The wireless control device 120 may be operable to transmit and receive RF signals 106 including Internet Protocol packets directly to and from the dimmer switches 110A, 110B, and/or 110C, or to and from the dimmer switches 110A, 110b, and/or 110C via the wireless router 130 (and perhaps also via the gateway device 310). The router 130 (and perhaps the gateway device 310) may be operable to transmit one or more digital messages via RF signals 106 that may correspond to the RF signals 106 received from the wireless control device 120. For example, the wireless control device 120, the router 130, the laptop 312, and/or the laptop 314 may transmit the RF signals 106 directly to the dimmer switch 110A, dimmer switch 110B, and/or dimmer switch 110C via a point-to-point communication, such as a Wi-Fi communication link, e.g., an 802.11 wireless local area network (LAN), or other direct wireless communication link, e.g., a Wi-MAX communication link or a Bluetooth® communication link.

The wireless control device 120, the wireless router 130, and the gateway device 310 may communicate with the dimmer switch 110A, dimmer switch 110B, and/or dimmer switch 110C via one or more devices that have a private IP address and are connected to the AC powers source 102 via an Ethernet IP based protocol (e.g., TCP/IP and/or "HomePlug" protocols) that may be carried via the conductors that deliver electrical energy from the AC power source 102 to the various devices (e.g., router 130, gateway device 310, laptop 312, laptop 314, dimmer switches 110A, 110B, and/or 110C). The gateway device 310 and the dimmer switches 110A, 110B, and/or 110C may also transmit, receive, and/or interpret energy pulses that may be used to convey signals and/or information via the conductors may deliver electrical energy from the AC power source 102 to the gateway device 310 and the dimmer switches 110A, 110B, and/or 110C.

Figure 4B:
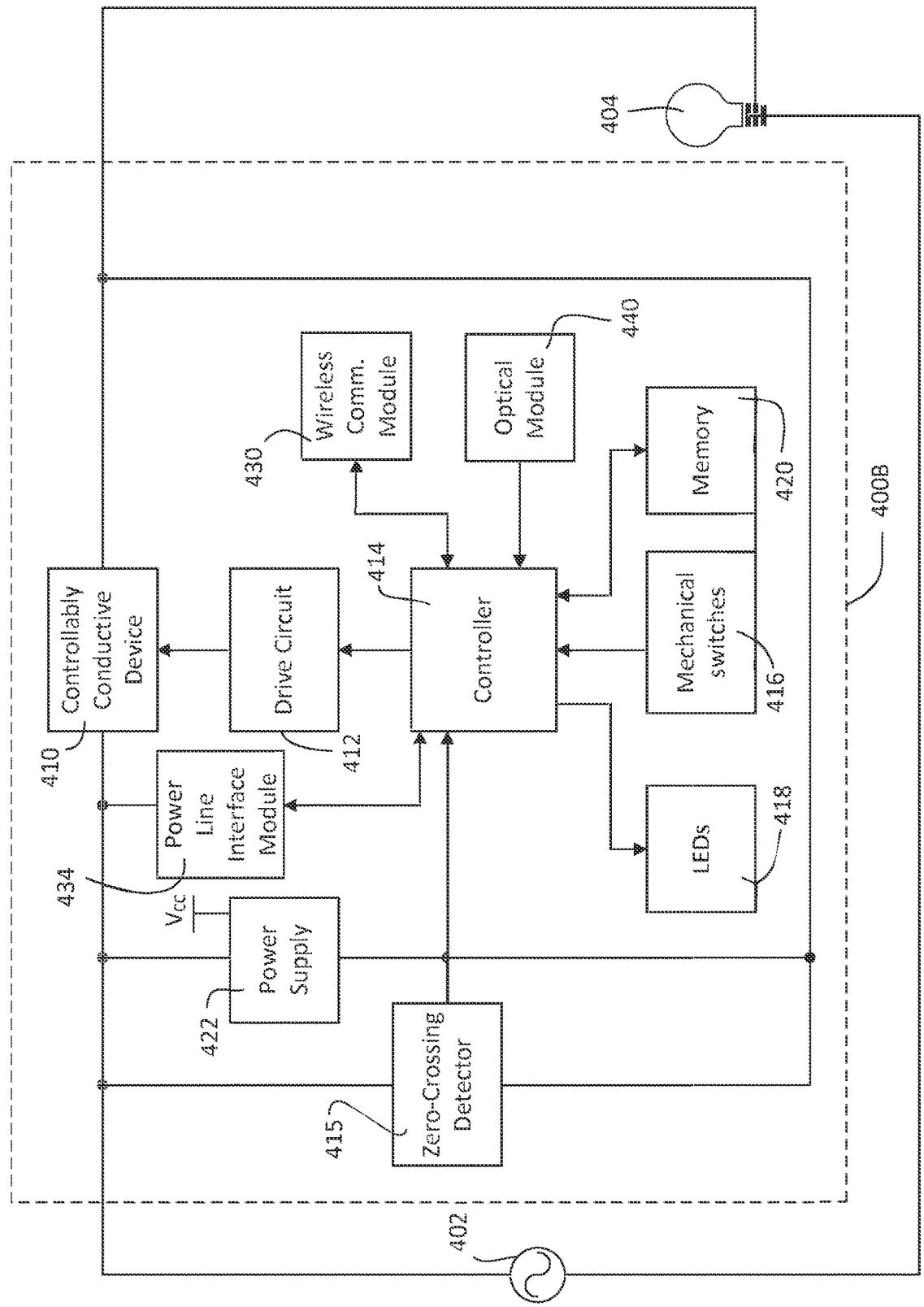
FIG. 4B is a second simplified example block diagram of the dimmer switch of the RF lighting control system of FIG. 2.

FIG. 4B is a simplified block diagram of a second example of a dimmer switch 440B (e.g., one of the dimmer switches 110A, 110B, 110C of FIG. 3B). The example dimmer switch 400B comprises a controllably conductive device 410, a drive circuit 412, a controller 414, a zero-crossing detector 415, mechanical switches 416, light-emitting diodes 418, a memory 420, a power supply 422, and an optical module 440. The elements within these devices, the functions of these devices, and/or interactions of and among these devices may be the same or similar as described with respect to FIG. 4A.

The dimmer switch 400B further includes a wireless communication module 430 for transmitting and receiving RF signals (e.g., the RF signals 106) to and from a wireless device (e.g., the wireless control device 120, the gateway device 310, and/or the wireless router 130). For example, the wireless communication module 430 may be configured to communicate via a Wi-Fi communication link, a Wi-MAX communication link, a Clear Connect™ communication link, and/or a Bluetooth® communication link. The wireless communication module 430 may also include one or more other radio protocol modules (e.g. radios) that may be operable to communicate via a number of other protocols including Wi-Fi and/or a proprietary RF protocol such as the Clear Connect™ protocol.

The dimmer switch 400B may further include a power line interface module 434 for transmitting and receiving signals carried on the conductors connected to the AC power source 402 via an Ethernet IP based protocol (e.g. TCP/IP, and/or a power line communication protocol such as the "HomePlug" protocol) where the conductors may deliver electrical energy from the AC power source 402 to the dimmer switch 400B. The power line interface module 434 may also transmit, receive, and/or interpret energy pulses that may be used to convey signals and/or information via the conductors may deliver electrical energy from the AC power source 402 to the dimmer switch 400B.

When the wireless communication module 430 comprises a Wi-Fi module, the controller 414 is operable to control the lighting load 404 in response to received digital messages in Wi-Fi packets (i.e., Internet Protocol packets received via the Wi-Fi signals). The wireless communication module 430 may comprise one or more RF transceivers and one or more antennas.

The wireless control device 120 may control the controllably conductive device 410 using the optical signals, the digital messages received via the RF signals 106 and/or digital messages received via the Ethernet IP based powerline protocol (e.g., TCP/IP and/or "HomePlug" protocols). For example, the controller 414 may determine the module from which the signals are received, e.g., from the wireless communication module 430, the power line interface module 434, or the optical module 440, and the controllably conductive device 410 may be controlled based on those signals. The controller 414 may also transmit messages to the wireless control device 120 via optical signals, digital messages transmitted via the RF signals 106, and/or digital messages transmitted via the Ethernet IP based powerline protocol. For example, the controller 414 of the dimmer switch 110 (400B) may be used to transmit digital messages to the wireless control device 120 via wireless communication. The digital messages may include alerts and/or feedback and status information regarding the lighting load 404. The digital messages may also include error messages or indications as to whether the dimmer switch 400B is able to communicate via a wireless communication link or RF signals 106, for example.

Figure 3C:
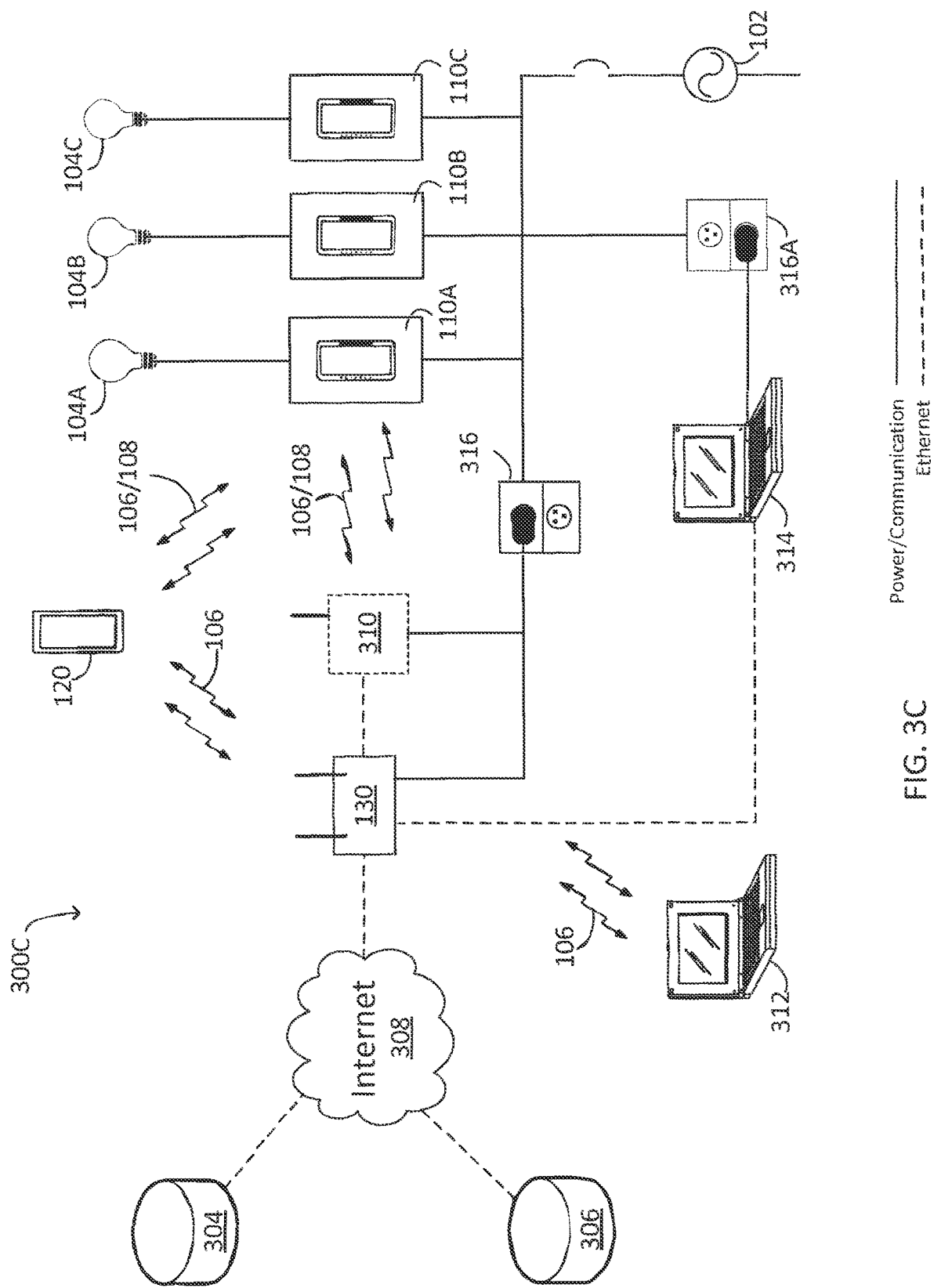
FIG. 3C is a diagram of a third example network in which one or more contemplated techniques and/or devices may be employed.

FIG. 3C is a diagram of an exemplary network environment 300C. In FIG. 3C, the router 130 may communicate with one or more servers 304, 306 via the Internet 308, perhaps as accessed through the "cloud." For example, router 130 may establish at least one Internet Protocol (IP) connection with either server 304 and/or 306. The at least one IP connection between the router 130 and either server 304 and/or 306 may be made via a router's 130 public IP address (and the respective public IP addresses of server 304 and/or server 306). In some configurations, a gateway device 310 may communicate with the router 130 via a wired or wireless connection. Any number of devices in FIG. 3C, such as, for example, the router 130, the gateway device 310, laptop 314, dimmer switch 110A, dimmer switch 110B, and/or dimmer switch 110C, among other devices, may be connected to the AC power supply 102, perhaps via a hardwired connection or via electrical outlets 316 and 316A, for example. Dimmer switch 110A, dimmer switch 110B, and/or dimmer switch 110C may operate lighting load 104A, lighting load 104B, and/or lighting load 104C as described previously herein.

The router 130 may establish a non-public (or private) IP address for the router 130 and may establish an IP connection and corresponding respective private IP addresses with the dimmer switches 110A, 110B, and/or 110C, gateway device 310, the laptop 312, and/or the laptop 314. The router 130 may coordinate one or more of the respective private IP addresses with one or more IP connections (e.g., multimedia or data streams) that are received via the router's 130 public IP address (e.g., from the server 304 and/or 306). The router 130 may coordinate one or more of the respective public IP addresses (e.g., of the server 304 and/or server 306) with one or more IP connections (e.g., multimedia or data) that are sent to the router's 130 private IP address (e.g., from the gateway device 310, laptop 312, and/or laptop 314). The router 130 may perform such coordination via a Network Address Table (NAT) (not shown), or the like, for example.

The wireless control device 120 may be operable to transmit and receive RF signals 106 including Internet Protocol packets directly to the dimmer switches 110A, 110B, and/or 110C, or to dimmer switches 110A, 110B, and/or 110C via the wireless router 130 (and perhaps also via the gateway device 310). The router 130 (and perhaps the gateway device 310) may be operable to transmit one or more digital messages via RF signals 106 that may correspond to the RF signals 106 received from the wireless control device 120. In some configurations, the one or more digital messages may be transmitted according to a proprietary RF communication protocol (such as, for example, the Clear Connect™ protocol) to the dimmer switch 110A, dimmer switch 110B, and/or dimmer switch 110C via RF signals 108. The dimmer switch 110A, dimmer switch 110B and/or dimmer switch 110C may include a wireless communication module operable to receive digital messages according to the proprietary RF communication protocol via the RF signals 108.

For example, the wireless control device 120, the router 130, the laptop 312, and/or the laptop 314, (and perhaps the gateway device 310) may transmit the RF signals 106 directly to the dimmer switch 110A, dimmer switch 110B, and/or dimmer switch 110C via a point-to-point communication, such as a Wi-Fi communication link, e.g., an 802.11 wireless local area network (LAN), or other direct wireless communication link, e.g., a Wi-MAX communication link or a Bluetooth® communication link. The wireless control device 120 may communicate with the laptop 314 via one or more devices that have a private IP address and are connected to the AC powers source 102 via an Ethernet IP based protocol (e.g., TCP/IP and/or "HomePlug" protocols) that may be carried via the conductors that deliver electrical energy from the AC power source 102 to the various devices (e.g., router 130, the gateway device 310, and/or laptop 314).

In FIG. 3C, a communication dongle (not shown) could be connected to the wireless control device 120 that may allow for direct communication between the wireless control device 120 and the dimmer switch 110A, dimmer switch 110B, and/or dimmer switch 110C using the proprietary RF communication protocol via RF signals 108. For example, the communication dongle could be plugged into a headphone jack on the wireless control device 120, or a USB port on wireless control device 120.

Figure 4C:
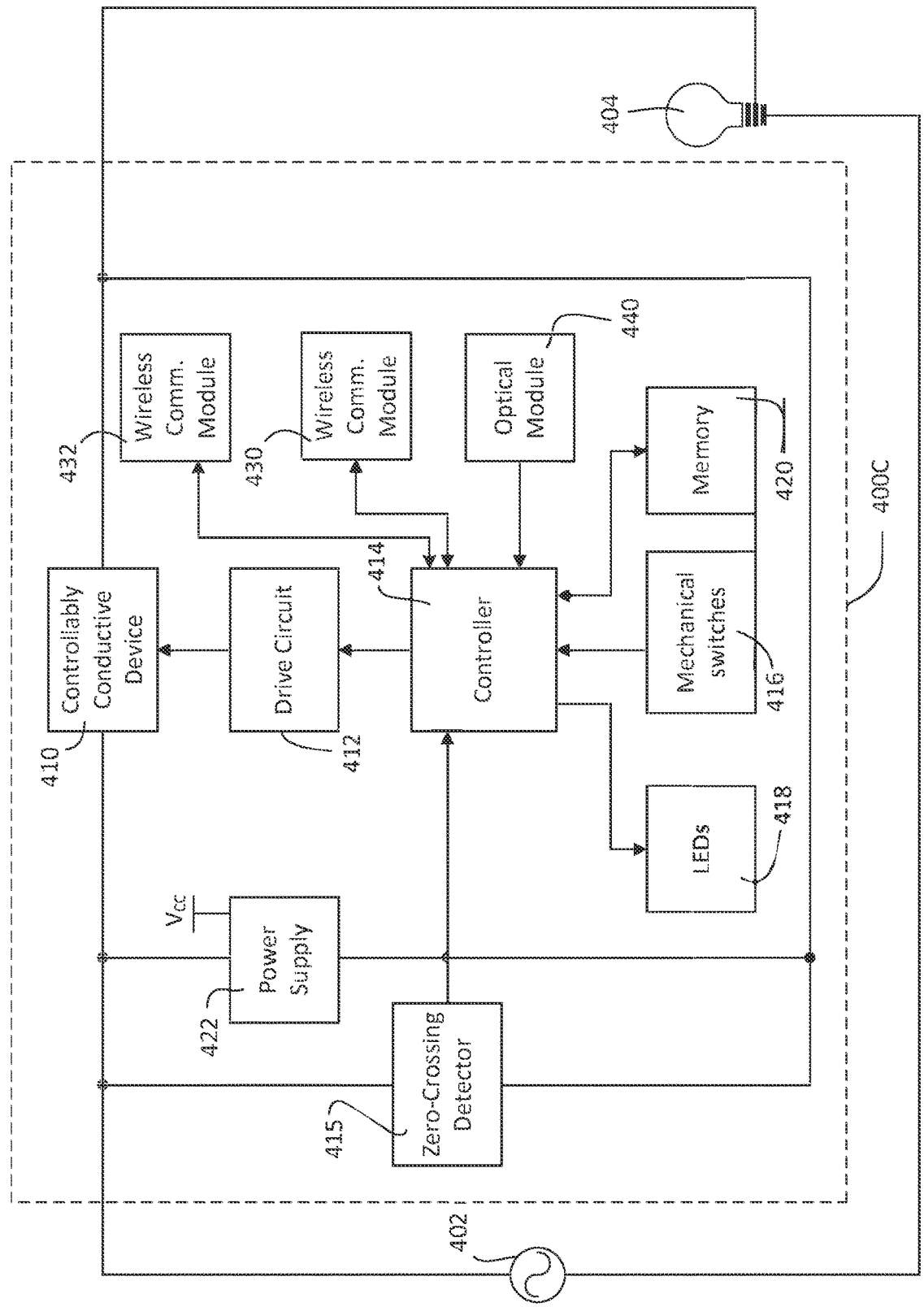
FIG. 4C is a third simplified example block diagram of the dimmer switch of the RF lighting control system of FIG. 2.

FIG. 4C is a simplified block diagram of a third example of a dimmer switch 400C (e.g., one of the dimmer switches 110A, 110B, 110C of FIG. 3C). The example dimmer switch 400C comprises a controllably conductive device 410, a drive circuit 412, a controller 414, a zero-crossing detector 415, mechanical switches 416, light-emitting diodes 418, a memory 420, a power supply 422, and an optical module 440. The elements within these devices, the functions of these devices, and/or interactions of and among these devices may be the same or similar as described with respect to FIG. 4A.

The dimmer switch 400C further includes a wireless communication module 430 for transmitting and receiving RF signals (e.g., the RF signals 106 and/or 108) to and from a wireless device (e.g., the wireless control device 120, the gateway device 310, and/or the wireless router 130). For example, the wireless communication module 430 may be configured to communicate via a Wi-Fi communication link, a Wi-MAX communication link, a Clear Connect™ communication link, and/or a Bluetooth® communication link. The wireless communication module 430 may also include one or more other radio protocol modules (e.g. radios) that may be operable to communicate via a number of other protocols including Wi-Fi and/or a proprietary RF protocol such as the Clear Connect™ protocol. The dimmer switch 400C may further include a second wireless communication module 432 that may be configured to communicate via a Wi-Fi communication link, a Wi-MAX communication link, a Clear Connect™ communication link, and/or a Bluetooth® communication link. The wireless communication module 432 may also include one or more other radio protocol modules (e.g. radios) that may be operable to communicate via a number of other protocols including the Wi-Fi protocol and/or a proprietary RF protocol such as the Clear Connect™ protocol.

When the wireless communication modules 430 and/or 432 comprise a Wi-Fi module, the controller 414 is operable to control the lighting load 404 in response to received digital messages in Wi-Fi packets (i.e., Internet Protocol packets received via the Wi-Fi signals). The wireless communication module 430 and/or 432 may comprise one or more RF transceivers and one or more antennas.

The wireless control device 120 may control the controllably conductive device 410 using the optical signals and/or the digital messages received via the RF signals 106 and/or RF signals 108. For example, the controller 414 may determine the module from which the signals are received, e.g., from the wireless communication module 430 and/or 432 or the optical module 440, and the controllably conductive device 410 may be controlled based on those signals. The controller 414 may also transmit messages to the wireless control device 120 via optical signals or digital messages transmitted via the RF signals 106 and/or RF signals 108. For example, the controller 414 of the dimmer switch 400C may be used to transmit digital messages to the wireless control device 120 via wireless communication. The digital messages may include alerts and/or feedback and status information regarding the lighting load 404. The digital messages may also include error messages or indications as to whether the dimmer switch 400C is able to communicate via a wireless communication link or RF signals 106 and/or RF signals 108, for example.

Figure 3D:
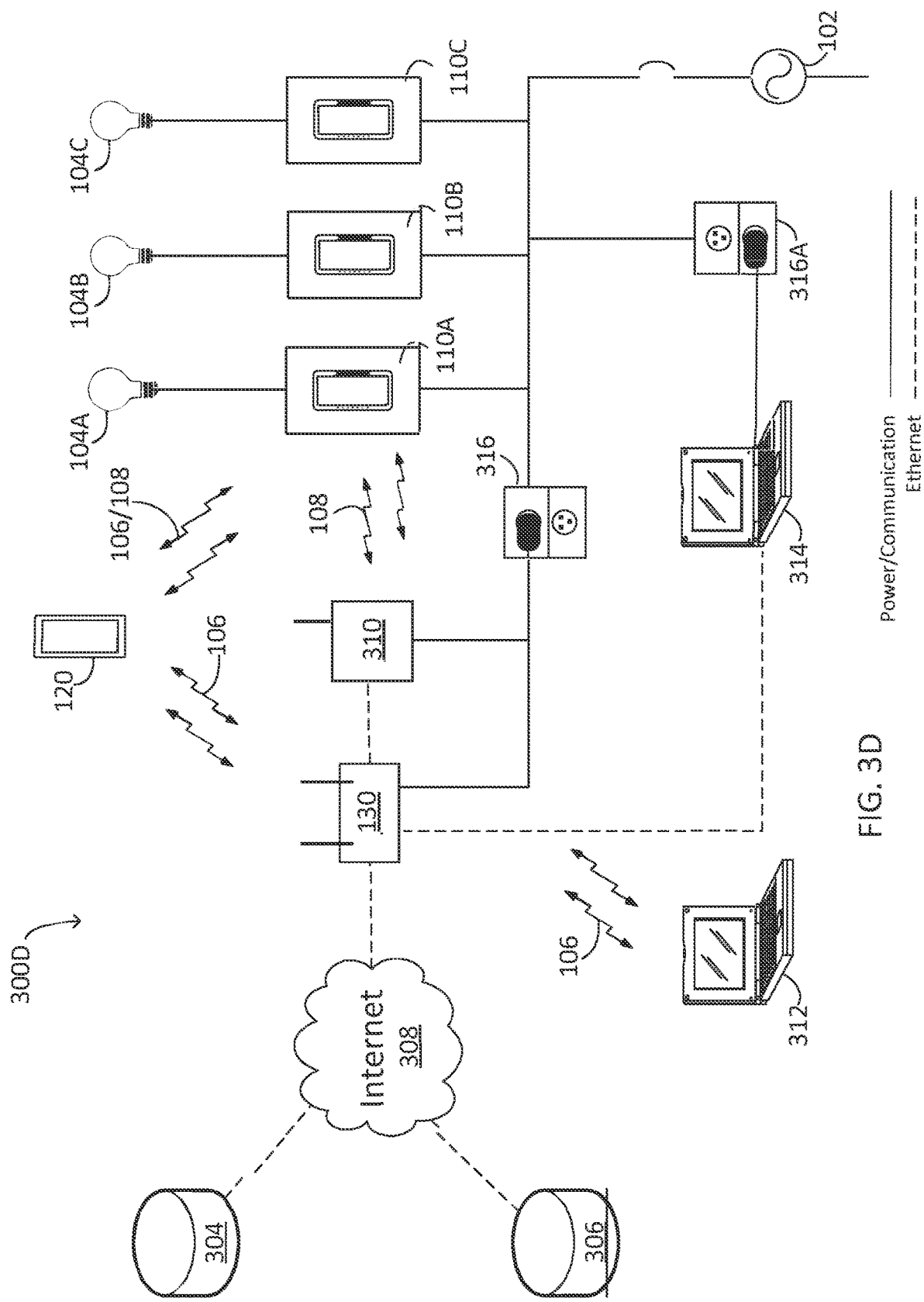
FIG. 3D is a diagram of a fourth example network in which one or more contemplated techniques and/or devices may be employed.

FIG. 3D is a diagram of an exemplary network environment 300D. In FIG. 3D, the router 130 may communicate with one or more servers 304, 306 via the Internet 308, perhaps as accessed through the "cloud." For example, router 130 may establish at least one Internet Protocol (IP) connection with either server 304 and/or 306. The at least one IP connection between the router 130 and either server 304 and/or 306 may be made via a router's 130 public IP address (and the respective public IP addresses of server 304 and/or server 306). A gateway device 310 may communicate with the router 130 via a wired or wireless connection. Any number of devices in FIG. 3D, such as, for example, the router 130, the gateway device 310, laptop 314, dimmer switch 110A, dimmer switch 110B, and/or dimmer switch 110C, among other devices, may be connected to the AC power supply 102, perhaps via a hardwired connection or via electrical outlets 316 and 316A, for example. Dimmer switch 110A, dimmer switch 110B, and/or dimmer switch 110C may operate lighting load 104A lighting load 104B, and/or lighting load 104C as described previously herein.

The router 130 may establish a non-public (or private) IP address for the router 130 and may establish an IP connection and corresponding respective private IP addresses with the gateway device 310, the laptop 312, and/or the laptop 314. The router 130 may coordinate one or more of the respective private IP addresses with one or more IP connections (e.g., multimedia or data streams) that are received via the router's 130 public IP address (e.g., from the server 304 and/or 306). The router 130 may coordinate one or more of the respective public IP addresses (e.g., of the server 304 and/or server 306) with one or more IP connections (e.g., multimedia or data) that are sent to the router's 130 private IP address (e.g., from the gateway device 310, laptop 312, and/or laptop 314). The router 130 may perform such coordination via a Network Address Table (NAT) (not shown), or the like, for example.

The wireless control device 120 may be operable to transmit and receive RF signals 106 including Internet Protocol packets directly to dimmer switches 110A, 110B, and/or 110C, or to dimmer switches 110A, 110B, and/or 110C via the gateway device 310 (and perhaps via the wireless router 130). The gateway device 310 may be operable to transmit one or more digital messages that may correspond to the RF signals 106 received from the wireless control device 120 (perhaps via the router 130). The one or more digital messages may be transmitted according to a proprietary RF communication protocol (such as, for example, the Clear Connect™ protocol) to the dimmer switch 110A, dimmer switch 110B, and/or dimmer switch 110C via RF signals 108. The dimmer switch 110A, dimmer switch 110B and/or dimmer switch 110C may include a wireless communication module operable to receive digital messages according to the proprietary RF communication protocol via the RF signals 108. The gateway device 310 may communicate with the dimmer switch 110A, 110B and/or dimmer switch 110C via an Ethernet based IP protocol (e.g., TCP/IP and/or "HomePlug" protocols) that may be carried via the conductors that deliver electrical energy from the AC power source 102 to the various devices such as the gateway device 310, dimmer switch 110A, and/or dimmer switch 110B, among other devices illustrated in FIG. 3D.

In FIG. 3D, a communication dongle (not shown) could be connected to the wireless control device 120 that may allow for direct communication between the wireless control device 120 and the dimmer switch 110A, dimmer switch 110B, and/or dimmer switch 110C using the proprietary RF communication protocol via RF signals 108. For example, the communication dongle could be plugged into a headphone jack on the wireless control device 120, or a USB port on 120.

The router 130 may further establish IP connections and corresponding respective private IP addresses with dimmer switch 110A, 110B, and/or 110C. In such situations, the router 130 may coordinate one or more of the respective private IP addresses of the dimmer switch 110A, dimmer switch 110B, and/or dimmer switch 110C with one or more IP connections (e.g., multimedia or data streams) that are received via the router's 130 public IP address (e.g., from the server 304 and/or 306). The router 130 may coordinate one or more of the respective public IP addresses (e.g., of the server 304 and/or server 306) with one or more IP connections (e.g., multimedia or data) that are sent to the router's 130 private IP address (e.g., from the dimmer switch 110A, dimmer switch 110B, and/or dimmer switch 110C).

When dimmer switch 110A, dimmer switch 110B, and/or dimmer switch 110C may be assigned private IP addresses, the wireless control device 120 (among other devices with private IP addresses) may transmit RF signals 106 including Internet Protocol packets to the dimmer switch 110A, dimmer switch 110B, and/or dimmer switch 110C. For example, the wireless control device 120, the router 130, the laptop 312, and/or the laptop 314 may transmit the RF signals 106 directly to the dimmer switch 110A, dimmer switch 110B, and/or dimmer switch 110C via a point-to-point communication, such as a Wi-Fi communication link, e.g., an 802.11 wireless local area network (LAN), or other direct wireless communication link, e.g., a Wi-MAX communication link or a Bluetooth® communication link. The wireless control device 120 may communicate with the dimmer switch 110A, dimmer switch 110B, and/or dimmer switch 110C via one or more devices that have a private IP address and are connected to the AC powers source 102 via an Ethernet IP based protocol (e.g., TCP/IP and/or "HomePlug" protocols) that may be carried via the conductors that deliver electrical energy from the AC power source 102 to the various devices (e.g., router 130, gateway device 310, and/or laptop 314).

Figure 4D:
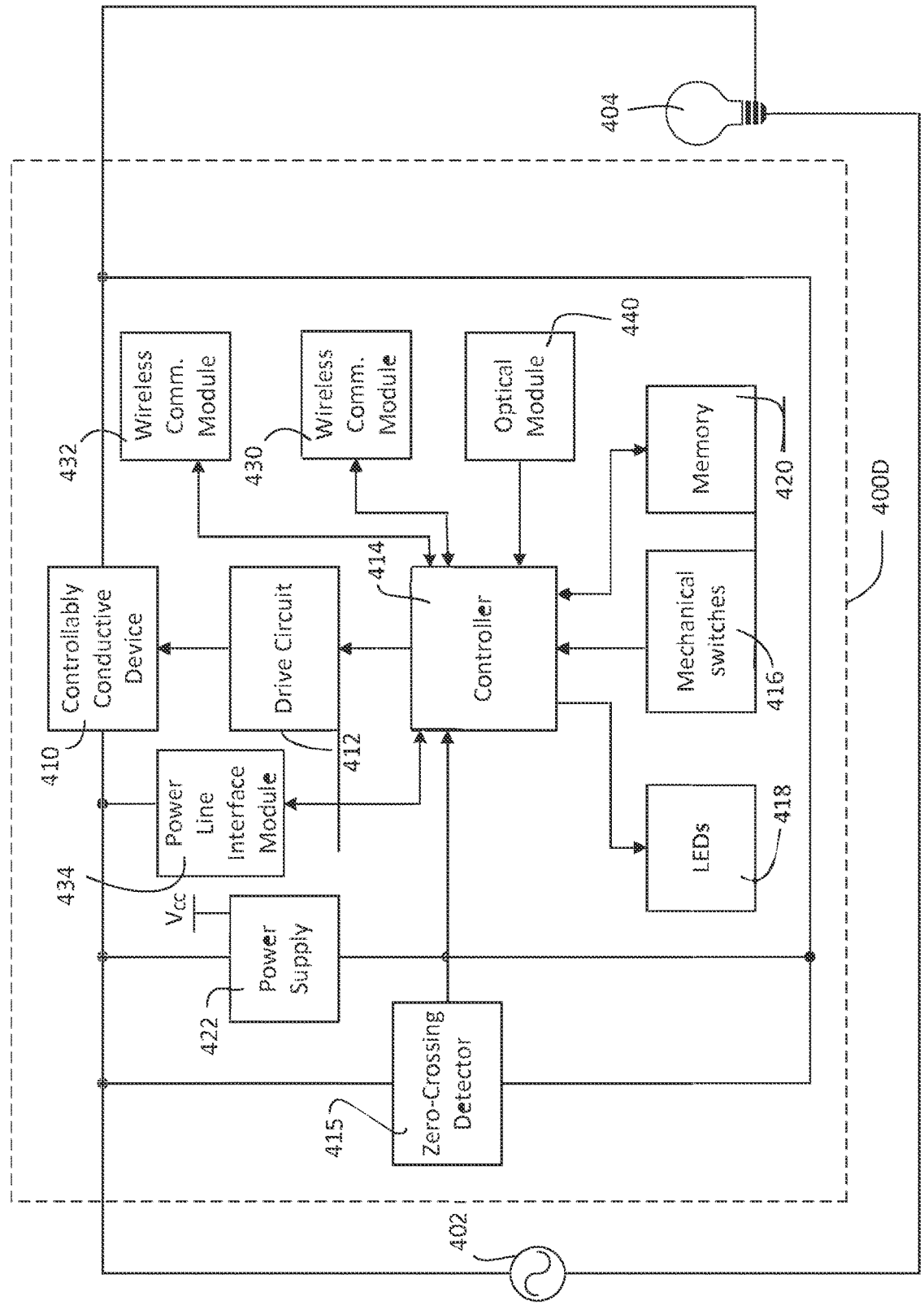
FIG. 4D is a fourth simplified example block diagram of the dimmer switch of the RF lighting control system of FIG. 2.

FIG. 4D is a simplified block diagram of a fourth example of a dimmer switch 400D (e.g., one of the dimmer switches 110A, 110B, 110C of FIG. 3D). The example dimmer switch 400D comprises a controllably conductive device 410, a drive circuit 412, a controller 414, a zero-crossing detector 415, mechanical switches 416, light-emitting diodes 418, a memory 420, a power supply 422, and an optical module 440. The elements within these devices, the functions of these devices, and/or interactions of and among these devices may be the same or similar as described with respect to FIG. 4A.

The dimmer switch 400D further includes a wireless communication module 430 for transmitting and receiving RF signals (e.g., the RF signals 106 and/or 108) to and from a wireless device (e.g., the wireless control device 120, the gateway device 310, and/or the wireless router 130). For example, the wireless communication module 430 may be configured to communicate via a Wi-Fi communication link, a Wi-MAX communication link, a Clear Connect™ communication link, and/or a Bluetooth® communication link. The wireless communication module 430 may also include one or more other radio protocol modules (e.g. radios) that may be operable to communicate via a number of other protocols including Wi-Fi and/or a proprietary RF protocol such as the Clear Connect™ protocol. The dimmer switch 400D may further include a second wireless communication module 432 that may be configured to communicate via a Wi-Fi communication link, a Wi-MAX communication link, a Clear Connect™ communication link, and/or a Bluetooth® communication link. The wireless communication module 432 may also include one or more other radio protocol modules (e.g. radios) that may be operable to communicate via a number of other protocols including the Wi-Fi protocol and/or a reliable RF protocol such as the Clear Connect™ protocol. The dimmer switch 400D may further include a power line interface module 434 for transmitting and receiving signals carried on the conductors connected to the AC power source 402 via an Ethernet IP based protocol (e.g., TCP/IP, and/or a power line communication protocol such as the "HomePlug" protocol) where the conductors may deliver electrical energy from the AC power source 402 to the dimmer switch 400D. The power line interface module 434 may also transmit, receive, and/or interpret energy pulses that may be used to convey signals and/or information via the conductors may deliver electrical energy from the AC power source 402 to the dimmer switch 400D.

When the wireless communication modules 430 and/or 432 comprise a Wi-Fi module, the controller 414 is operable to control the lighting load 04 in response to received digital messages in Wi-Fi packets (i.e., Internet Protocol packets received via the Wi-Fi signals). The wireless communication module 430 and/or 432 may comprise one or more RF transceivers and one or more antennas.

The wireless control device 120 may control the controllably conductive device 410 using the optical signals and/or the digital messages received via the RF signals 106 and/or RF signals 108. For example, the controller 414 may determine the module from which the signals are received, e.g., from the wireless communication module 430 and/or 432 or the optical module 440, and the controllably conductive device 410 may be controlled based on those signals. The controller 414 may also transmit messages to the wireless control device 120 via optical signals or digital messages transmitted via the RF signals 106 and/or RF signals 108. For example, the controller 414 of the dimmer switch 110 (400D) may be used to transmit digital messages to the wireless control device 120 via wireless communication. The digital messages may include alerts and/or feedback and status information regarding the lighting load 404. The digital messages may also include error messages or indications as to whether the dimmer switch 110 (400D) is able to communicate via a wireless communication link or RF signals 106 and/or RF signals 108, for example.

Referring once again to FIGS. 3A-3D, FIGS. 3A-3D illustrate exemplary environments 300A-300D in which one or more coordination techniques may be implemented. In FIGS. 3A-3D, dimmer switch 110A may be operatively connected to lighting load 104A, dimmer switch 110B may be operatively connected to lighting load 104B, and dimmer switch 110C may be operatively connected to lighting load 104C. Laptop 312 may be in use by a user and may be in wireless communication with router 130 (e.g., for public Internet access). Router 130 may establish private IP addresses with the dimmer switches 110A, 110B, 110C, and/or the laptop 312, as described previously herein. A user may use the wireless control device 120 and/or the laptop 312 to control one or more of the dimmer switches 110A, 110B, and/or 110C. For example, the user may wish to turn off one or more of the lighting loads 104A, 104B, and/or 104C; or to turn on one or more of the lighting loads 104A, 104B, and/or 104C; or to put one or more of the respective lighting loads into respectively different dimmed and/or de-energized conditions (e.g., dim 104A to 75%, dim 104B to 50%, and turn off (or dim completely) 104C—among numerous other contemplated lighting load conditions). The user may wish (and may issue a corresponding command) that the lighting loads 104A, 104B, and/or 104C adjust to new dimming conditions at substantially the same time (e.g., within the scope of human perception).

For example, the user may not want to observe a noticeable delay between the dimming adjustments of lighting loads 104A, 104B, and/or 104C—instead the user may wish to perceive that the lighting loads 104A, 104B, 104C adjust to a freshly commanded dimming condition at the same time (e.g., as humans are capable of such perception). Humanly perceivable delays in any the respective dimming adjustments of lighting loads 104A, 104B, and/or 104C may be referred to as "the popcorn effect"—a term that may be used for illustration and explanation and not by way of limitation. One or more contemplated techniques may address the popcorn effect so that, when the user so commands, dimming adjustments commanded by the user of dimmer switch 110A, 110B, and/or 110C may be made at substantially the same time (e.g., synchronized such that a typical person may not perceive a time difference between the dimming effect of lighting load 104A, 104B, and/or 104C).

Figure 5:
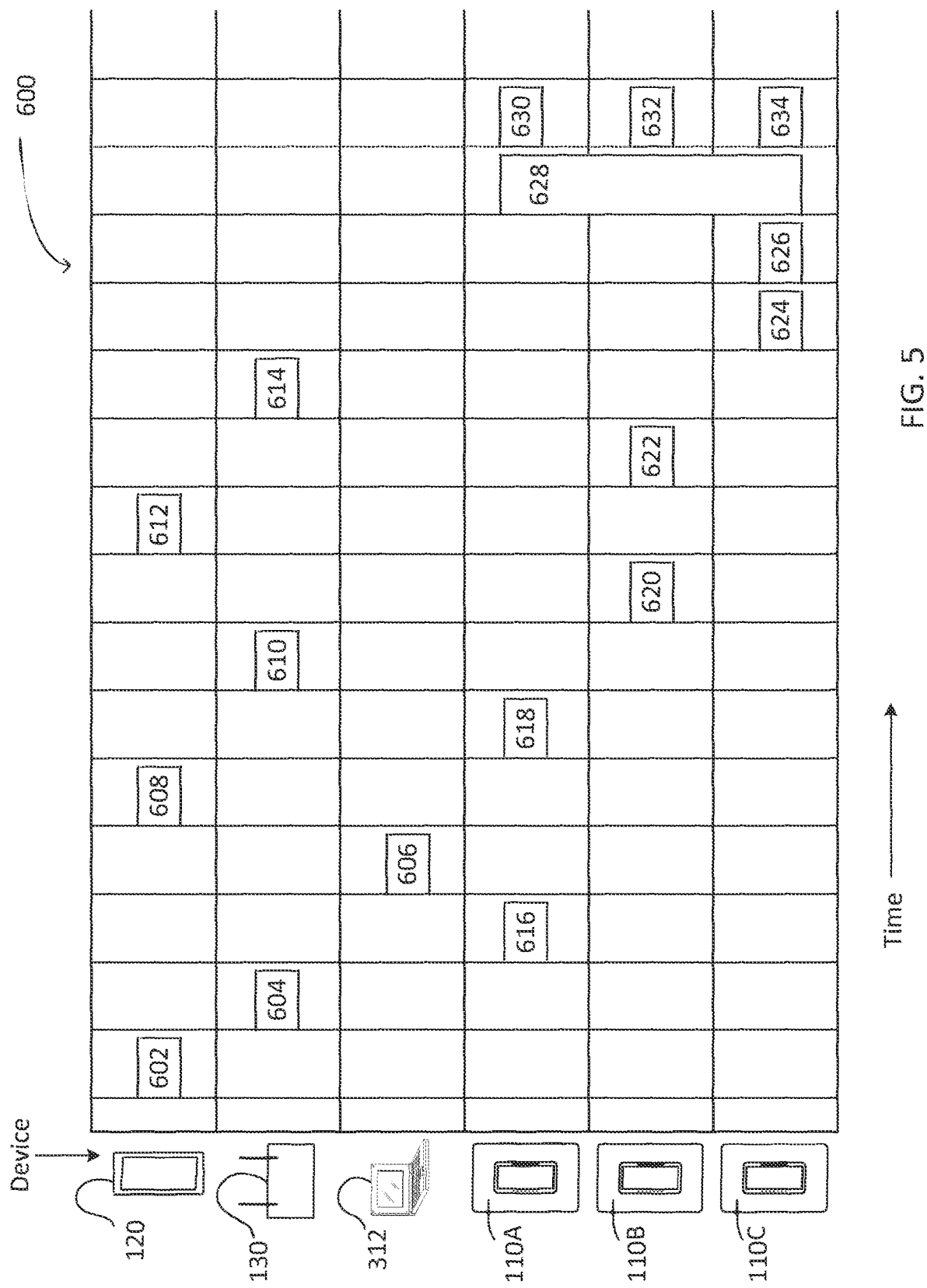
FIG. 5 is an example timing scheme for one or more load control device coordination techniques.
Figure 6:
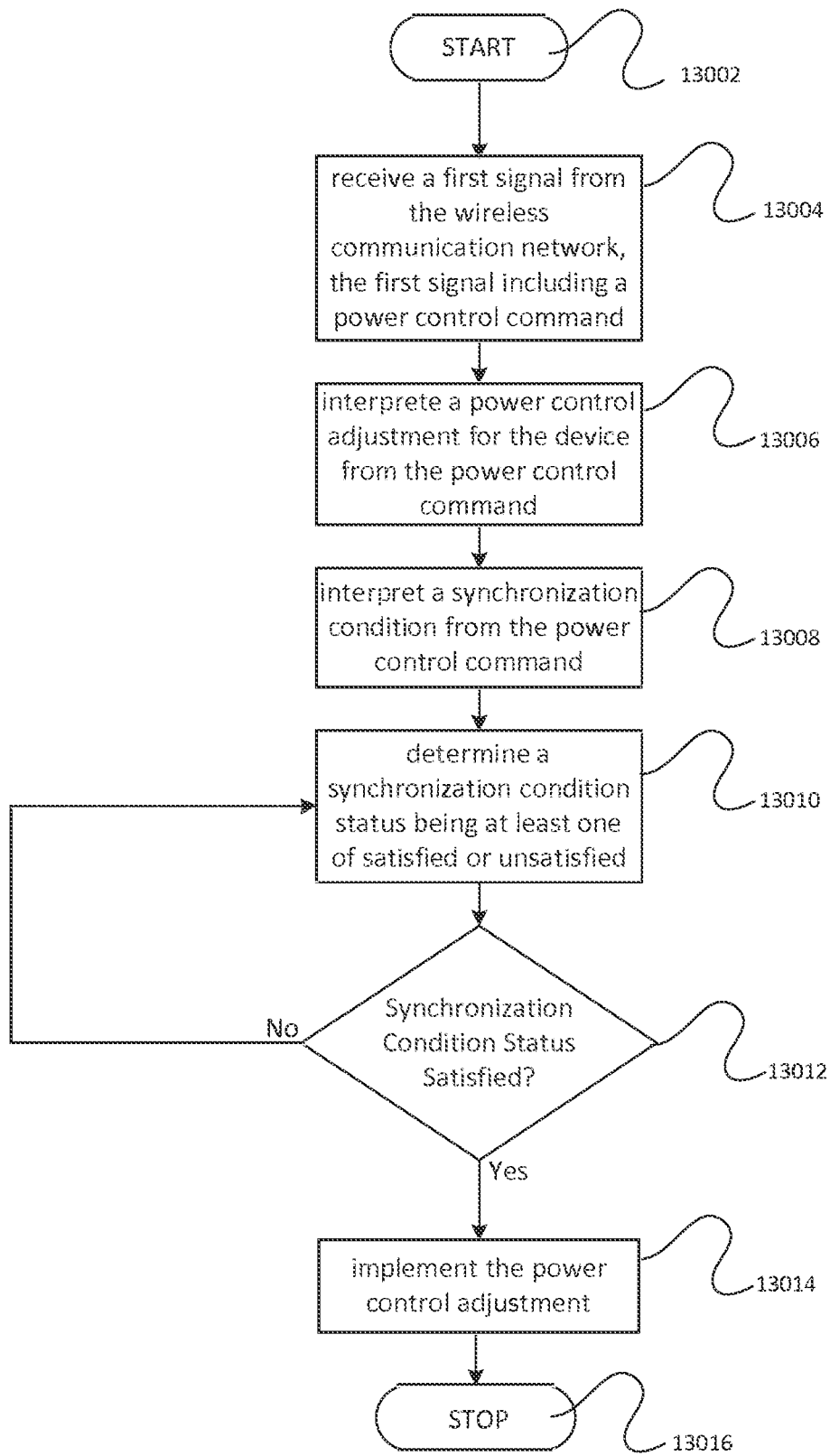
FIG. 6 is a flow chart of an example technique to provide operational coordination to a load control device.

FIG. 5 depicts an exemplary timing scheme 600 (that may include any of the elements from the network environments 300A-300D and shown or not shown) that illustrates the popcorn effect that a user may experience in the previously described example (where in the example the user sends the command via the wireless control device 120 while the user is streaming music via laptop 312). Referring to FIG. 6, at 602 the wireless control device 120 may send a message (e.g., one or more IP packets) to command dimmer switch 110A to adjust the load that dimmer switch 110A controls (lighting load 104A). At 604, the router 130 may send a message (e.g., one or more IP packets) commanding the dimmer switch 110A to adjust the lighting load 104A. At 606, the laptop 312 may send a message (e.g., one or more IP packets) requesting music from a public IP server to the router 130. At 608, the wireless control device 120 may send a message (e.g., one or more IP packets) to command dimmer switch 110B to adjust the load that dimmer switch 110B controls (lighting load 104B). At 610, the router 130 may send a message (e.g., one or more IP packets) commanding the dimmer switch 110B to adjust the lighting load 104B as well as sending one or more music IP packets to laptop 312. At 612, the wireless control device 120 may send a message (e.g., one or more IP packets) to command dimmer switch 110C to adjust the load that dimmer switch 110C controls (lighting load 104C). At 614, the router 130 may send a message (e.g., one or more IP packets) commanding the dimmer switch 110C to adjust the lighting load 104C as well as sending one or more additional music IP packets to laptop 312.

Any of the devices of the network environments 300A-300D (e.g. wireless control device 120, dimmer switches 110A, 110B, and/or 110C, router 130, gateway device 310, laptops 312 and/or 314, among others shown and not shown) for a number of contemplated purposes, may include one or more radios. Any of the devices of the network environments 300A-300D may include at least one radio that may be operable to transmit via multiple protocols (e.g. the Wi-Fi and/or the Clear Connect™ protocols) over multiple communication networks, wired and/or wireless, that may be operable to communicate with the respective protocols. Alternatively or additionally, any of the devices of the network environments 300A-300D may include at least one radio that may be operable to transmit/receive via at least one protocol (e.g. Wi-Fi) and at least a second radio that may be operable to transmit/receive via at least another protocol (e.g. a proprietary RF protocol like the Clear Connect™ protocol) over multiple communication networks, wired and/or wireless, that may be operable to communicate with the respective protocols.

One or more, or any, of the devices of the network environments 300A-300D (e.g. wireless control device 120, dimmer switches 110A, 110B, and/or 110C, router 130, gateway device 310, laptops 312 and/or 314, among others shown and not shown) may serve as a master gateway node (e.g. may be elected by the other devices to serve as the master gateway node). The master gateway node may serve as a Dynamic Host Configuration Protocol (DHCP) node, for example. The master gateway node may provide one or more, or any, of the other devices of the network environments 300A-300D with information that may enable the one or more other devices to connect to the Wi-Fi network (e.g. an IP based protocol). By way of example, and not limitation, the master gateway node may provide the one or more devices of the network environments 300A-300D with an SSID, an SSID password, an IP address, and/or other credentials to enable the respective devices to connect (or register) to the Wi-Fi protocol network (e.g. via the router 130). Such Wi-Fi access information may be preconfigured on any of the respective devices of the networks environments 300A-300D.

The aforementioned Wi-Fi access information may be provided to the one or more devices of the network environments 300A-300D via a reliable broadcast-capable RF protocol, such as the previously described Clear Connect™ protocol, on a reliable broadcast-capable RF network, either approximately at a time that it may be useful for the one or more devices to join the Wi-Fi communication network, or at some time earlier. For example, the Wi-Fi access information (e.g. even if preconfigured) for the one or more devices may be updated by the master gateway node either periodically or under certain conditions. Also, the master gateway node may provide an indication (e.g. via the Clear Connect™ protocol) to the one or more devices of the network environments 300A-300D that may invite the one or more devices to use the Wi-Fi protocol access information to communicate, at least temporarily (e.g. for a firmware upgrade), with one or more devices of the network environments 300A-300D (e.g. the master gateway node or any other device of the network environments 300A-300D). For example, perhaps after the invited node may have completed the function for which it was invited to join the Wi-Fi network (e.g. a firmware upgrade is fully communicated and/or completed), the master gateway node may signal (via Wi-Fi and/or Clear Connect™ protocols) the invited node to discontinue Wi-Fi communication and/or to leave the Wi-Fi network. By requesting that the invited node discontinue Wi-Fi communication and/or to leave the Wi-Fi network, the burden on the router 130 and/or Wi-Fi communication may be minimized. Alternatively or additionally, the invited node may be configured to discontinue Wi-Fi communication and/or to leave the Wi-Fi network after the completion of the function for which it was invited to communicate via Wi-Fi and/or after the end of a timeout period (e.g. the invited node may leave the Wi-Fi network on its own determination and without being requested to leave the Wi-Fi network).

Alternatively or additionally, the one or more devices of the network environments 300A-300D may use the Wi-Fi access information to communicate with one or more other devices of the network environments 300A-300D at a time and/or under a condition determined by the one or more devices of the network environments 300A-300D that may be in possession of Wi-Fi access information. For example, dimmer switch 110A may use its respective Wi-Fi access information to join the Wi-Fi communication network to communicate its monitoring database information (to one or other devices of the network environments 300A-300D) via the Wi-Fi protocol because its monitoring database may have become full. After the dimmer switch 110A communicates its monitoring database, the dimmer switch 110A may discontinue communication via the Wi-Fi protocol until such time as the dimmer switch 110A may be invited to (or may decide itself to) communicate once again via the Wi-Fi protocol.

The Wi-Fi protocol may be useful via which to communicate high bandwidth data (e.g. configuration data such as firmware upgrades and/or data for relatively sophisticated user interfaces, programming data, and/or database data management) among Wi-Fi capable (IP capable) devices. A reliable broadcast-capable RF protocol, such as the previously described Clear Connect™ protocol may be useful via which to communicate relatively low bandwidth data and/or relatively high performance signaling information (e.g. operational data such as operational commands, operational (runtime) error codes, programming error codes, and/or timing synchronization signals, among other relatively high performance data). It may be useful to allocate high bandwidth data signaling (e.g. firmware upgrades, user interface data, and/or database information transfer) more to Wi-Fi protocol communication so that reliable broadcast-capable RF protocol communication, such as via the Clear Connect™ protocol, may be allocated for the relatively high performance data signaling (e.g. time synchronization signaling).

For example, radios using the Wi-Fi protocol may communicate at a frequency of 2.4 GHz. This frequency may be considered part of the industrial, scientific, and medical (ISM) radio band—which may fairly crowded, may be widely available, and may be generally considered to be an unlicensed band. Radios may communicate using the Wi-Fi protocol at a range of 120 to 300 feet (with 802.11n, up to double these ranges may be possible), for example. Radios may also communicate using the Wi-Fi protocol at a rate of up to 54 Mbits/s (802.11g) and/or 300 Mbit/s (802.11n), with an average data rate of approximately 22 Mbit/s, for example. Radios may also communicate via Wi-Fi with an output power of approximately 20-100 mW (13-20 dBm).

For example, radios using the Clear Connect™ protocol may communicate at frequencies of 434 MHz and/or 868 MHz (perhaps based on regional factors). For example, 434 MHz and 868 MHz bands may be far less crowded than other bands and may be licensed, and may be subject to a relatively stringent set of regulations, including the United States' Federal Communications Commission (FCC) regulations that may limit transmit power and/or duty cycle, for example. Radios may communicate using the Clear Connect™ protocol at a range of 30 to 60 feet indoor and/or 300 feet open air (extendable via repeaters), for example. Radios may communicate using the Clear Connect™ protocol at a rate of up to 62.5 Kbit/s, for example. Radios may communicate via Clear Connect™ with an output power of approximately 4 mW (5 dBm).

One or more techniques may minimize the popcorn effect that the user may observe. For example, at 616, dimmer switch 110A may detect the command from router 130. At 618, dimmer switch 110A may send an acknowledgement (ACK) of the command to the wireless control device 120. At 620, dimmer switch 110B may detect the command from router 130. At 622, dimmer switch 110B may send an acknowledgement (ACK) of the command to the wireless control device 120. At 624, dimmer switch 110C may detect the command from router 130. At 626, dimmer switch 110C may send an acknowledgement (ACK) of the command to the wireless control device 120. At 628, at substantially the same time, dimmer switch 110A, dimmer switch 110B, and/or dimmer switch 110C may receive a trigger signal or message (e.g., one or more IP packets recognized as a predetermined trigger by dimmer switch 110A, dimmer switch 110B, and/or dimmer switch 110C). Alternatively at 628, a trigger condition may be determined at substantially the same time at the dimmer switch 110A, dimmer switch 110B, and/or dimmer switch 110C based on information contained in the received commands. At 630, dimmer switch 110A may adjust lighting load 104A to 75% in response to the trigger. At 632, dimmer switch 110B may adjust lighting load 104B to 50% in response to the trigger. At 634, dimmer switch 110C may adjust lighting load 104C to 0% (or de-energize lighting load 104C) in response to the trigger. For example, the respective dimmer switch adjustments at 630, 632, and 634 may occur at substantially the same time (e.g., in a manner in which any differences in time are not perceptible by a typical person).

The messages from the wireless control device 120 at 602, 608, and/or 612, as well as the commands to the respective dimmer switches 110A, 110B, and/or 110C at 604, 610, and/or 614 may be sent using a reliable broadcast-capable RF protocol, such as the previously described proprietary Clear Connect™ protocol (where the one or more music IP packets at 610 and/or 614 may be sent via a Wi-Fi based message). The commands sent at 604, 610, and/or 614 may also include instructions to execute the adjustment when the trigger is detected or determined. In addition, the acknowledgements that may be sent at 618, 622, and/or 626 as well as the trigger at 628 may also be sent using a reliable broadcast-capable RF protocol, such as the previously described proprietary Clear Connect™ protocol. Wi-Fi based messages may be used for monitoring other message and/or firmware upgrades, among other tasks.

Alternatively or additionally, the messages from the wireless control device 120 at 602, 608, and/or 612, as well as the commands to the respective dimmer switches 110A, 110B, and/or 110C at 604, 610, and/or 614 may be sent using a Wi-Fi based message. The commands sent at 604, 610, and/or 614 may also include instructions to execute the adjustment when the trigger is detected or determined. In addition, the acknowledgements that may be sent at 618, 622, and/or 626 may be sent using a Wi-Fi based message. The trigger at 628 may be sent from the router 130, for example, via an Ethernet based IP protocol (e.g., TCP/IP and/or "HomePlug" protocols) that may be carried via the conductors that deliver electrical energy from the AC power source 102 to the router 130 and dimmer switches, 110A, 110B, and/or 110C. Alternatively or additionally, the trigger may be sent from one or more other devices that may also be in connection with the AC power source 102.

Alternatively or additionally, at least one of the dimmer switches 110A, 110B, and/or 110C may be elected as a "master" node by the other dimmer switches. For example, dimmer switches 110B and 110C may elect 110A as the master node (e.g. via a reliable broadcast-capable RF protocol or a power line protocol, and via respective communication networks operable to communicate via such protocols). As the master node, dimmer switch 110A may determine that the wireless control device 120 sent the commands at 604, 610, and/or 614 (e.g. to itself and to the devices that may have elected dimmer switch 110A as their master node) that may also include instructions to execute the adjustment when the trigger is detected (via its Wi-Fi radio for example). Alternatively or additionally, the wireless control device 120 may send a command for a particular lighting "scene", e.g. "reading level", "theater level", "mid-day level", among others. The respective commanded scene may involve preconfigured settings for one or more of the dimmer switches 110A, 110B, and/or 110C. As the master node, dimmer switch 110A may recognize the commanded scene and may further recognize that the commanded scene involves one or more of the devices that may have elected the dimmer switch 110A as their master node. For example, dimmer switch 110B and/or dimmer switch 110C may be configured to respond to commands (e.g. the trigger) sent from their elected master node, in this example dimmer switch 110A. The master node dimmer switch 110A may determine a trigger condition and/or timing. The trigger at 628 may be sent from the master node 110A, for example, via an Ethernet based IP protocol (e.g., TCP/IP and/or the "HomePlug" protocols) that may be carried via the conductors that deliver electrical energy from the AC power source 102 to the router 130 and dimmer switches, 110A, 110B, and/or 110C.

Alternatively or additionally, the master node 110A may send the trigger at 628 via a proprietary protocol such as the Clear Connect™ protocol, for example. In such scenarios, the master node dimmer switch 110A may determine the trigger condition based at least in part on the acknowledgements from dimmer switches 110B and/or 110C sent at 622 and 626—which may be sent via the Ethernet based IP protocol (e.g., TCP/IP and/or "HomePlug" protocols) that may be carried via the conductors that deliver electrical energy from the AC power source 102 to the router 130 and dimmer switches, 110A, 110B, and/or 110C, and/or via the Clear Connect™ protocol (wired or wireless, via second radio for example).

Alternatively or additionally, the master node dimmer switch 110A may not base the trigger 628 condition on the acknowledgements sent at 622 and 626 (and also may not concern itself with whether the commands 620 and/or 624 were respectively received at dimmer switches 110B and/or 110C). As the master node dimmer switch dimmer switch 110A may be aware that the wireless control device 120 has commanded action of the dimmer switches 110A, 110B, and/or 110C, the master node dimmer switch 110A may determine the trigger 628 condition regardless of the acknowledgements 622 and/or 626, for example.

Alternatively or additionally, another node of the network environments 300A-300D (either shown or not shown) may be elected as the master node instead of the dimmer switch 110A. For example, the router 130 and/or the gateway device 310 may be elected as the master node for the dimmer switches 110A, 110B, and/or 110C (and perhaps other nodes shown and not shown). For example, the master node router 130 and/or the master node gateway device 310 may function in a manner similar to the previously described exemplary master node dimmer switch 110A.

Alternatively or additionally, the messages from the wireless control device 120 at 602, 608, and/or 612, as well as the commands to the respective dimmer switches 110A, 110B, and/or 110C at 604, 610, and/or 614 may be sent using a Wi-Fi based message. In addition, the acknowledgements that may be sent at 618, 622, and/or 626 may be sent using a Wi-Fi based message. In lieu of sending a trigger at 628, the commands to the respective dimmer switches 110A, 110B, and/or 110C at 604, 610, and/or 614 may include an adjustment time or a time-referenced signal (e.g., make the commanded adjustment at 5:30 pm or 4:02:23.34). The adjustment time may serve as the effective trigger. The Wi-Fi capable devices may use network time protocol (NTP) or some other technique of staying in relatively close time synchronization with the other Wi-Fi capable devices (e.g., this could be done locally, as well with some central manager, such as the router 130 for example). Dimmers 110A, 110B, and/or 110C may receive the commands at 604, 610, and/or 614 may wait until the specified adjustment time to perform the adjustment. For example, if the time may have for some reason already passed, the dimmer switches may perform the adjustments immediately. The router 130 (that may send the commands at 604, 610, and/or 614) may be a dedicated Wi-Fi-enabled device that may stay in time-sync with some or all of the devices. Another Wi-Fi node may serve as the time-sync device and may be one of the dimmer switches 110A, 110B, and/or 110C, for example. The adjustment time may be determined based at least in part on how many adjustment commands are to be sent and/or to how many dimmer switches (or other devices) the adjustment commands are to be sent (e.g., if 2 adjustment commands are to be sent, the adjustment time may be sooner in time than if 10 adjustment commands are to be sent).

Alternatively or additionally, the messages from the wireless control device 120 at 602, 608, and/or 612, as well as the commands to the respective dimmer switches 110A, 110B, and/or 110C at 604, 610, and/or 614 may be sent using a Wi-Fi based message. In addition, the acknowledgements that may be sent at 618, 622, and/or 626 may be sent using a Wi-Fi based Ethernet IP protocol message (an Ethernet based IP protocol (e.g., TCP/IP) that may be carried via Wi-Fi based message). Internet Protocol (IP), which is the basis for wired and wireless Ethernet communications, is built on top of something known as the link layer, which is the lowest layer in the Internet Protocol suite. A component of this link layer is a frame synchronization scheme. Generally speaking, a frame is a series of data bits that may be demarcated by a sequence of synchronization bits or symbols that may make it possible for senders and/or receivers to recognize the beginning and end of a frameset, or segment (chunk) of data. Sender and receiver may agree on the frame synchronization mechanism and symbols that may be used before they can start talking. IP (e.g., 802.11 protocol) may use a framing mechanism at the lower levels.

In an IP protocol, frames may be divided into specific and/or standardized sections. IP frames may include management frames that may allow for the maintenance of communication. IP frames may include authentication frames, association request frames, association response frames, beacon frames, de-authentication frames, disassociation frames, probe request frames, probe response frames, re-association request frames, and/or re-association response frames. Frames may include a MAC header. The first two bytes of the MAC header may form a frame control field that may specify the form and function of the frame. In an IP protocol, data streams may be segmented into a series of frames. For example, beacon frames may be sent periodically from an access point to announce its presence and provide the SSID, among other information. Frames like the beacon frames, for example, may be counted and the counted frames may be used as a synchronization or trigger mechanism.

In lieu of sending a trigger at 628, the commands to the respective dimmer switches 110A, 110B, and/or 110C at 604, 610, and/or 614 may include an adjustment queue. For example, the message at 604 may include an instruction such as dimmer switch 110A, adjust to 75% after 67 beacon frames have gone by. The message at 610 may include an instruction to dimmer switch 110B to adjust to 50% after 34 beacon frames have gone by. The message at 614 may include an instruction to dimmer switch 110C to adjust to 0% after 15 beacon frames have gone by. The messages 604, 610, and/or 614 may not include the beacon frame based adjustment references and instead a trigger may be sent at 628 that may be received by the dimmer switches 110A, 110B, and/or 110C that may include the respective beacon frame adjustment references.

Alternatively or additionally, the messages from the wireless control device 120 at 602, 608, and/or 612, as well as the commands to the respective dimmer switches 110A, 110B, and/or 110C at 604, 610, and/or 614 may be sent using a Wi-Fi based message. In addition, the acknowledgements that may be sent at 618, 622, and/or 626 may be sent using a Wi-Fi based Ethernet IP protocol message. In lieu of sending a trigger at 628, the adjustment command messages sent at 604, 610, and/or 614 may include an indication of the IP address of which dimmer switch 110A, 110B, or 110C may be the last dimmer switch to receive an adjustment command. With such an indication, dimmer switches 110A and 110B may execute their respective adjustments at the time that dimmer switches 110A and 110B detect the acknowledgement sent by dimmer switch 110C at 622—which dimmer switches 110A and 110B may be monitoring for (or "sniffing" for) due to the indication that was received in the adjustment command messages 604 and 610. In other words, the acknowledgement message sent at 622 by dimmer switch 110C may effectively serve as the trigger for dimmer switches 110A and 110B to execute their respective adjustments. Dimmer switch 110C may execute its commanded adjustment at the same time that dimmer switch 110C sends the acknowledgement at 622.

Alternatively or additionally, the messages from the wireless control device 120 at 602, 608, and/or 612, as well as the commands to the respective dimmer switches 110A, 110B, and/or 110C at 604, 610, and/or 614 may be sent using a reliable broadcast-capable RF protocol, such as the previously described proprietary Clear Connect™ protocol (where the one or more music IP packets at 610 and/or 614 may be sent via a Wi-Fi based message). The commands sent at 604, 610, and/or 614 may also include instructions to execute the adjustment when the trigger is detected. In addition, the acknowledgements that may be sent at 618, 622, and/or 626 may also be sent using a reliable broadcast-capable RF protocol, such as the previously described proprietary Clear Connect™ protocol. The trigger at 628 may be sent via a User Datagram Protocol (UDP). UDP is part of the Internet protocol suite. With UDP, messages may be sent as datagrams to other devices on an Internet Protocol (IP) network without requiring prior communications to set up special transmission channels or data paths. For example, a short but multi-message UDP broadcast stream may be used to synchronize the activity.

As UDP based messages may not be acknowledged and may be overridden by other network traffic, in order to ensure that the trigger message reaches the dimmer switches 110A, 110B, and/or 110C, a 12 to 15 message (for example) UDP multicast burst to a multicast address (e.g., a MAC address) subscribed to by dimmer switches 110A, 110B, and/or 110C. Upon receipt of at least one UDP message, the dimmer switches 110A, 110B, and/or 110C may execute their respective commanded adjustments in a synchronous manner. The dimmer switches 110A, 110B, and/or 110C may be configured to ignore more than a first UDP trigger message so that undesired adjustments may be avoided. For example, the dimmer switches 110A, 110B, and/or 110C may ignore more than a first UDP trigger message and may not act on any further UDP trigger messages until after a fresh or updated adjustment command is received at some future time.

FIG. 6 is a flow chart of an example technique to provide operational coordination to a load control device. A user may select a load control device as one of a number of devices among which to coordinate respective adjustments of power supplied to connected electrical loads (e.g. lighting loads) in order to avoid the popcorn effect. At 13002, a user may send a command via a wireless communication network for adjusting power, where the command impacts a number of load control devices, including an example load control device used to describe this example technique. At 13004, the load control device may receive a first signal from the wireless communication network via a first wireless communication circuit and via a first protocol. The first signal may include a power control command. At 13006, the load control device may interpret a power control adjustment for the device from the power control command. At 13008, the load control device may interpret a synchronization condition from the power control command. At 13010, the load control device may determine a synchronization condition status is at least one of satisfied or unsatisfied. At 13012, the load control device may continue to determine that the synchronization condition status is at least one of satisfied or unsatisfied. At 13014, the load control device may implement the power control adjustment after determining that the synchronization condition status is satisfied. At 13016, the user may view the adjustment of a number of lighting loads without perceiving the popcorn effect.

A user may notice a delay in time from when an adjustment of one or more of lighting loads 104A, 104B, and/or 104C may be initiated from the wireless control device 120. It may take approximately 50 milliseconds for an average person to perceive a change in lighting conditions, among other things. The delay in time may cause the user, perhaps due to impatience, frustration, or uncertainty, among other reasons, to attempt to repeat the initiation of the adjustment of lighting loads 104A, 104B, or 104C. The repeated initiation of the adjustment of lighting loads of 104A, 104B, and/or 104C may cancel out or negate the user's first initiation of the adjustment of the lighting loads 104A, 104B, and/or 104C. For example, referring to FIG. 6, by the time at 630, 632, and/or 634 when the adjustment commands are executed by the dimmer switches 110A, 110B, and/or 110C, the user may have already initiated another adjustment of one or more of the lighting loads 104A, 104, and/or 104C. And the second (or later) adjustment initiation may interfere with (e.g., negate or counteract) the first initiated adjustment of one or more of the lighting loads 104A, 104B, and/or 104C.

Dimmer switch 110A, dimmer switch 110B, and/or dimmer switch 110C may be configured to ignore a command to execute an adjustment of its respective lighting load until a predetermined amount of time as elapsed after the respective dimmer switch 110A, 110B, and/or 110C has executed the last adjustment that it was commanded to make. In the example referred to earlier in regard to FIG. 6, if a user initiates an adjustment of lighting load 104A to 75%, lighting load 104B to 50%, and/or lighting load 110C to 0% (or off), the dimmer switches 110A, 110B, and/or 110C may be configured to ignore any further adjustment commands received prior to the expiration of a period of time (e.g., configured in the controller 414 of the dimmer switch) after the dimmer switches 110A, 110B, and/or 110C execute the first received adjustment command. By way of further example, and not limitation, should a user change their mind and wish lighting load 104A to adjust to 100% and not 75% (and issues a corresponding updated adjustment command), such an updated adjustment command may be ignored by dimmer switch 110A if the updated adjusted command is received less than 1.5 seconds after dimmer switch 110A adjusts lighting load 104A to 75% (e.g., 1.5 seconds after 630). A range of delay times, for example from 0.5 milliseconds to 5 seconds, among other ranges are contemplated.

While the present application has been described with reference to the dimmer switches 110, and the wireless control devices 120, the concepts described herein could be applied to any control devices that are operable to communicate with each other, such as, for example, dimming ballasts for driving gas-discharge lamps; light-emitting diode (LED) drivers for driving LED light sources; screw-in luminaires including integral dimmer circuits and incandescent or halogen lamps; screw-in luminaires including integral ballast circuits and compact fluorescent lamps; screw-in luminaires including integral LED drivers and LED light sources; electronic switches, controllable circuit breakers, or other switching devices for turning appliances on and off; plug-in load control devices, controllable electrical receptacles, or controllable power strips for each controlling one or more plug-in loads; motor control units for controlling motor loads, such as ceiling fans or exhaust fans; drive units for controlling motorized window treatments or projection screens; motorized interior or exterior shutters; thermostats for a heating and/or cooling systems; temperature control devices for controlling setpoint temperatures of HVAC systems; air conditioners; compressors; electric baseboard heater controllers; controllable dampers; humidity control units; dehumidifiers; water heaters; pool pumps; televisions; computer monitors; audio systems or amplifiers; generators; electric chargers, such as electric vehicle chargers; an alternative energy controllers; occupancy sensors, vacancy sensors, daylight sensors, temperature sensors, humidity sensors, security sensors, proximity sensors, keypads, battery-powered remote controls, key fobs, cell phones, smart phones, tablets, personal digital assistants, personal computers, timeclocks, audio-visual controls, safety devices, and central control transmitters.

Additionally, the techniques described herein may be implemented as a set of computer-executable instructions stored on a tangible computer-readable medium, such as a random-access or read-only memory for example. Such computer-executable instructions may be executed by a processor or microcontroller, such as a microprocessor, within the dimmer switch 110 or the wireless control device 120, for example.

The invention claimed is:

1. A system controller to synchronize the operation of a plurality of electrical load control devices, the system controller comprising:
   memory circuitry;
   first communication interface circuitry;
   control circuitry to:
      receive a command via the first communication interface circuitry;
      identify a plurality of electrical load control devices based on the received command;
      select one or more instructions responsive to identification of the plurality of electrical load control devices and based on the received command;
      determine one or more synchronization criteria based on the identified plurality of electrical load control devices and the selected one or more instructions, the one or more synchronization criteria to synchronize execution of the selected one or more instructions by the plurality of electrical load control devices; and
      cause a communication of the one or more instructions and the one or more synchronization criteria to each electrical load control device included in the identified plurality of electrical load control devices;
      wherein, in response to receipt of the communication of the one or more instructions and the one or more synchronization criteria, the identified plurality of electric load control devices synchronously execute the one or more instructions.

2. The system controller of claim 1, further comprising second communication interface circuitry, the second communication interface circuitry different than the first communication interface circuitry;
   wherein to cause the communication of the one or more instructions and the one or more synchronization criteria, the control circuitry to further:
      cause the communication of the one or more instructions and the one or more synchronization criteria to each electrical load control device included in the identified plurality of electrical load control devices via the second communication interface circuitry.

3. The system controller of claim 2:
   wherein to receive a command via the first communication interface circuitry, the control circuitry to further:
      receive the command using a first communication protocol via the first communication interface circuitry; and
   wherein to cause the communication of the one or more instructions and the one or more synchronization criteria via the second communication interface circuitry, the control circuitry to further:
      cause the communication of the one or more instructions and the one or more synchronization criteria using a second communication protocol different from the first communication protocol via the second communication interface circuitry.

4. The system controller of claim 1 wherein to determine the one or more synchronization criteria based on the identified plurality of load control devices and the selected one or more instructions, the control circuitry to further:
   determine one or more synchronization criteria that include transmission of a synchronization signal by the control circuitry to each of the plurality of electrical load control devices.

5. The system controller of claim 1 wherein to determine the one or more synchronization criteria based on the identified plurality of load control devices and the selected one or more instructions, the control circuitry to further:
   determine one or more synchronization criteria that include transmission of a synchronization signal by one of the plurality of electrical load control devices to each of the remaining plurality of electrical load control devices.

6. The system controller of claim 1 wherein to determine the one or more synchronization criteria based on the identified plurality of load control devices and the selected one or more instructions, the control circuitry to further:
   determine one or more synchronization criteria based on detection, by each of the plurality of electrical load control devices, of an acknowledgement message generated by each of the remaining plurality of electrical load control devices.

7. The system controller of claim 1, further comprising memory circuitry communicatively coupled to the control circuitry;
   wherein to select the one or more instructions responsive to the identification of the plurality of load control devices and based on the received command, the control circuitry to further:
      retrieve data representative of the one or more instructions from a data structure stored in the memory circuitry.

8. The system controller of claim 7 wherein to identify the plurality of electrical load control devices to receive the one or more instructions based on the received command, the control circuitry to further:
   retrieve data representative of the plurality of electrical load control devices from the data structure stored in the memory circuitry.

9. A method to synchronize the operation of a plurality of electrical load control devices, the method comprising:
   receiving, by control circuitry via first communication interface circuitry communicatively coupled to the control circuitry, at least one command;
   identifying, by the control circuitry, a plurality of electrical load control devices based on the received at least one command;
   selecting, by the control circuitry, one or more instructions responsive to identification of the plurality of electrical load control devices and based on the received command;

determining, by the control circuitry, one or more synchronization criteria based on the identified plurality of electrical load control devices and the selected one or more instructions, the one or more synchronization criteria to synchronize execution of the selected one or more instructions by the plurality of electrical load control devices; and causing, by the control circuitry, a communication of the one or more instructions and the one or more synchronization criteria to each electrical load control device included in the identified plurality of electrical load control devices;

wherein, in response to receipt of the communication of the one or more instructions and the one or more synchronization criteria, the identified plurality of electric load control devices synchronously execute the one or more instructions.

10. The method of claim 9 wherein causing a communication of the one or more instructions and the one or more synchronization criteria to each electrical load control device included in the identified plurality of electrical load control devices, further comprising:

causing, via second communication interface circuitry different than the first communication interface circuitry, the communication of the one or more instructions and the one or more synchronization criteria to each electrical load control device included in the identified plurality of electrical load control devices.

11. The method of claim 10:
wherein receiving the command by the control circuitry further comprises:
receiving the command by the control circuitry using a first communication protocol; and
wherein causing the communication of the one or more instructions and the one or more synchronization criteria to each electrical load control device included in the identified plurality of electrical load control devices further comprises:
causing, by the control circuitry, the communication of the one or more instructions and the one or more synchronization criteria using a second communication protocol different from the first communication protocol.

12. The method of claim 9 wherein determining the one or more synchronization criteria further comprises:
transmitting, by the control circuitry, a synchronization signal to each of the plurality of electrical load control devices.

13. The method of claim 9 wherein determining the one or more synchronization criteria further comprises:
causing, by the control circuitry, a transmission of a synchronization signal by one of the plurality of electrical load control devices to each of the remaining plurality of electrical load control devices.

14. The method of claim 9 wherein determining the one or more synchronization criteria further comprises:
causing, by the control circuitry, a detection by each of the plurality of electrical load control devices, of an acknowledgement message generated by each of the remaining plurality of electrical load control devices.

15. The method of claim 9 wherein selecting the one or more instructions responsive to the identification of the plurality of load control devices and based on the received command further comprises:

retrieving, by the control circuitry, data representative of the one or more instructions from a data structure stored in memory circuitry communicatively coupled to the control circuitry.

16. The method of claim 15 wherein identifying the plurality of electrical load control devices to receive the one or more instructions based on the received command further comprises:
retrieving, by the control circuitry, data representative of the plurality of electrical load control devices from the data structure stored in the memory circuitry.

17. A non-transitory, machine-readable, storage device that includes instructions that, when executed by electrical system synchronization control circuitry, causes the control circuitry to:
receive, via communicatively coupled first communication interface circuitry, at least one command;
identify a plurality of electrical load control devices based on the received at least one command;
select one or more instructions responsive to identification of the plurality of electrical load control devices and based on the received command;
determine one or more synchronization criteria based on the identified plurality of electrical load control devices and the selected one or more instructions, the one or more synchronization criteria to synchronize execution of the selected one or more instructions by the plurality of electrical load control devices; and
cause a communication of the one or more instructions and the one or more synchronization criteria to each electrical load control device included in the identified plurality of electrical load control devices;
wherein, in response to receipt of the communication of the one or more instructions and the one or more synchronization criteria, the identified plurality of electric load control devices synchronously execute the one or more instructions.

18. The non-transitory, machine-readable, storage device of claim 17 wherein the instructions that cause the electrical system synchronization control circuitry to cause the communication of the one or more instructions and the one or more synchronization criteria to each electrical load control device included in the identified plurality of electrical load control devices, further causes the control circuitry to:
cause the communication of the one or more instructions and the one or more synchronization criteria to each electrical load control device included in the identified plurality of electrical load control devices via second communication interface circuitry different than the communication interface circuitry.

19. The non-transitory, machine-readable, storage device of claim 18:
wherein the instructions that cause the electrical system synchronization control circuitry to receive the command further cause the control circuitry to:
receive the command by the control circuitry using a first communication protocol; and
wherein the instructions that cause the electrical system synchronization control circuitry to cause the communication of the one or more instructions and the one or more synchronization criteria to each electrical load control device included in the identified plurality of electrical load control devices further cause the control circuitry to:
cause the communication of the one or more instructions and the one or more synchronization criteria using a second communication protocol different from the first communication protocol.

20. The non-transitory, machine-readable, storage device of claim 17 wherein the instructions that cause the electrical system synchronization control circuitry to determine the one or more synchronization criteria further cause the control circuitry to:
transmit a synchronization signal to each of the plurality of electrical load control devices.

21. The non-transitory, machine-readable, storage device of claim 17 wherein the instructions that cause the electrical system synchronization control circuitry to determine the one or more synchronization criteria further cause the control circuitry to:
cause a transmission of a synchronization signal by one of the plurality of electrical load control devices to each of the remaining plurality of electrical load control devices.

22. The non-transitory, machine-readable, storage device of claim 17 wherein the instructions that cause the electrical system synchronization control circuitry to determine the one or more synchronization criteria further cause the control circuitry to:
cause a detection by each of the plurality of electrical load control devices, of an acknowledgement message generated by each of the remaining plurality of electrical load control devices.

23. The non-transitory, machine-readable, storage device of claim 17 wherein the instructions that cause the electrical system synchronization control circuitry to select the one or more instructions responsive to the identification of the plurality of load control devices and based on the received command further cause the control circuitry to:
retrieve data representative of the one or more instructions from a data structure stored in memory circuitry communicatively coupled to the control circuitry.

24. The non-transitory, machine-readable, storage device of claim 23 wherein the instructions that cause the electrical system synchronization control circuitry to identify the plurality of electrical load control devices to receive the one or more instructions based on the received command further cause the control circuitry to:
retrieve data representative of the plurality of electrical load control devices from the data structure stored in the memory circuitry.

\* \* \* \* \*